United States Patent
Shah et al.

(10) Patent No.: US 10,642,418 B2
(45) Date of Patent: May 5, 2020

(54) FINGER TRACKING IN WET ENVIRONMENT

(71) Applicant: Apple Inc., Cupertino, CA (US)

(72) Inventors: Apexit Shah, Cupertino, CA (US); Ari Y. Benbasat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 15/686,969

(22) Filed: Aug. 25, 2017

(65) Prior Publication Data

US 2018/0307374 A1   Oct. 25, 2018

Related U.S. Application Data

(60) Provisional application No. 62/488,014, filed on Apr. 20, 2017.

(51) Int. Cl.
  *G06F 3/041*   (2006.01)
  *G06F 3/044*   (2006.01)
  (Continued)

(52) U.S. Cl.
  CPC ............ *G06F 3/0418* (2013.01); *G06F 3/044* (2013.01); *G06K 9/0055* (2013.01);
  (Continued)

(58) Field of Classification Search
  CPC ...... G06F 3/0418; G06F 3/044; G06F 3/0412; G06F 3/0416; G06F 2203/04104; G06K 9/00355; G06K 9/00523
  See application file for complete search history.

(56) References Cited

U.S. PATENT DOCUMENTS

| | | | |
|---|---|---|---|
| 4,087,625 A | 5/1978 | Dym et al. | |
| 4,090,092 A | 5/1978 | Serrano | |

(Continued)

FOREIGN PATENT DOCUMENTS

| | | | |
|---|---|---|---|
| CN | 1202254 A | 12/1998 | |
| CN | 1246638 A | 3/2000 | |

(Continued)

OTHER PUBLICATIONS

European Search Report dated Jan. 31, 2018, for EP Application No. 17183937.6, four pages.

(Continued)

*Primary Examiner* — Bryan Earles
(74) *Attorney, Agent, or Firm* — Kubota & Basol LLP

(57) ABSTRACT

Touch input processing for touch-sensitive devices can be improved by filtering unintended contact detected on a touch-sensitive surface. In wet environments in particular, water on the touch-sensitive surface can be erroneously detected as touch input and degrade touch performance. In some examples, input patches can be classified as touch patches or non-touch patches prior to computationally-intensive touch processing. Filtering out unintended touches classified as non-touch patches can reduce processing requirements and save power. Additionally, classifying input patches can improve touch performance in wet environments. In some examples, input patches can be classified as touch patches or non-touch patches based on characteristics of edge touch nodes. In some examples, input patches can be classified as touch patches or non-touch patches based on a state-based signal threshold.

20 Claims, 14 Drawing Sheets

(51) Int. Cl.
 *G06F 9/00* (2006.01)
 *G06K 9/46* (2006.01)
 *G06K 9/00* (2006.01)

(52) U.S. Cl.
 CPC ..... *G06K 9/00355* (2013.01); *G06K 9/00523* (2013.01); *G06K 9/00543* (2013.01); *G06K 9/4604* (2013.01); *G06F 2203/04104* (2013.01)

(56) References Cited

U.S. PATENT DOCUMENTS

| | | | |
|---|---|---|---|
| 4,304,976 A | 12/1981 | Gottbreht et al. |
| 4,475,235 A | 10/1984 | Graham |
| 4,550,221 A | 10/1985 | Mabusth |
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,543,590 A | 8/1996 | Gillespie et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,847,690 A | 12/1998 | Boie et al. |
| 5,880,411 A | 3/1999 | Gillespie et al. |
| 5,889,236 A | 3/1999 | Gillespie et al. |
| 5,914,465 A | 6/1999 | Allen et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,204,897 B1 | 3/2001 | Colgan et al. |
| 6,239,788 B1 | 5/2001 | Nohno et al. |
| 6,310,610 B1 | 10/2001 | Beaton et al. |
| 6,323,846 B1 | 11/2001 | Westerman et al. |
| 6,329,044 B1 | 12/2001 | Inoue et al. |
| 6,452,514 B1 | 9/2002 | Philipp |
| 6,456,952 B1 | 9/2002 | Nathan |
| 6,587,358 B1 | 7/2003 | Yasumura |
| 6,690,387 B2 | 2/2004 | Zimmerman et al. |
| 6,730,863 B1 | 5/2004 | Gerpheide et al. |
| 6,847,354 B2 | 1/2005 | Vranish |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,395,717 B2 | 7/2008 | DeAngelis et al. |
| 7,412,586 B1 | 8/2008 | Rajopadhye et al. |
| 7,504,833 B1 | 3/2009 | Seguine |
| 7,538,760 B2 | 5/2009 | Hotelling et al. |
| 7,548,073 B2 | 6/2009 | Mackey et al. |
| 7,580,030 B2 | 8/2009 | Marten |
| 7,639,234 B2 | 12/2009 | Orsley |
| 7,663,607 B2 | 2/2010 | Hotelling et al. |
| 7,719,523 B2 | 5/2010 | Hillis |
| 7,701,539 B2 | 8/2010 | Shih et al. |
| 7,864,503 B2 | 1/2011 | Chang |
| 7,898,122 B2 | 3/2011 | Andrieux et al. |
| 7,907,126 B2 | 3/2011 | Yoon et al. |
| 7,932,898 B2 | 4/2011 | Philipp et al. |
| 8,026,904 B2 | 9/2011 | Westerman |
| 8,040,321 B2 | 10/2011 | Peng et al. |
| 8,040,326 B2 | 10/2011 | Hotelling et al. |
| 8,045,783 B2 | 10/2011 | Lee et al. |
| 8,058,884 B2 | 11/2011 | Betancourt |
| 8,068,097 B2 | 11/2011 | GuangHai |
| 8,120,371 B2 | 2/2012 | Day et al. |
| 8,125,312 B2 | 2/2012 | Orr |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,339,286 B2 | 12/2012 | Cordeiro |
| 8,355,887 B1 | 1/2013 | Harding et al. |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,507,811 B2 | 8/2013 | Hotelling et al. |
| 8,508,495 B2 | 8/2013 | Hotelling et al. |
| 8,537,126 B2 | 9/2013 | Yousefpor et al. |
| 8,542,208 B2 | 9/2013 | Krah et al. |
| 8,576,193 B2 | 11/2013 | Hotelling |
| 8,593,410 B2 | 11/2013 | Hong et al. |
| 8,593,425 B2 | 11/2013 | Hong et al. |
| 8,614,688 B2 | 12/2013 | Chang |
| 8,633,915 B2 | 1/2014 | Hotelling et al. |
| 8,665,237 B2 | 3/2014 | Koshiyama et al. |
| 8,680,877 B2 | 3/2014 | Lee et al. |
| 8,760,412 B2 | 6/2014 | Hotelling et al. |
| 8,766,950 B1 | 7/2014 | Morein et al. |
| 8,773,146 B1 | 7/2014 | Hills et al. |
| 8,773,351 B2 | 7/2014 | Rekimoto |
| 8,810,543 B1 | 8/2014 | Kurikawa |
| 8,884,917 B2 | 11/2014 | Seo |
| 8,902,172 B2 | 12/2014 | Peng et al. |
| 8,917,256 B2 | 12/2014 | Roziere |
| 8,922,521 B2 | 12/2014 | Hotelling et al. |
| 8,957,874 B2 | 2/2015 | Elias |
| 8,976,133 B2 | 3/2015 | Yao et al. |
| 8,982,096 B2 | 3/2015 | Hong et al. |
| 8,982,097 B1 * | 3/2015 | Kuzo ................... G06F 3/0418 345/174 |
| 9,000,782 B2 | 4/2015 | Roziere |
| 9,001,082 B1 | 4/2015 | Rosenberg et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,151,791 B2 | 10/2015 | Roziere |
| 9,189,119 B2 * | 11/2015 | Liao ................... G06F 3/0418 |
| 9,250,757 B2 | 2/2016 | Roziere |
| 9,261,997 B2 | 2/2016 | Chang et al. |
| 9,280,251 B2 | 3/2016 | Shih |
| 9,292,137 B2 | 3/2016 | Kogo |
| 9,317,165 B2 | 4/2016 | Hotelling et al. |
| 9,329,674 B2 | 5/2016 | Lee et al. |
| 9,329,723 B2 | 5/2016 | Benbasat et al. |
| 9,372,576 B2 | 6/2016 | Westerman |
| 9,442,330 B2 | 9/2016 | Huo |
| 9,535,547 B2 | 1/2017 | Roziere |
| 9,582,131 B2 | 2/2017 | Elias |
| 9,640,991 B2 | 5/2017 | Blondin et al. |
| 9,690,397 B2 | 6/2017 | Shepelev et al. |
| 9,785,295 B2 * | 10/2017 | Yang ...................... G06F 3/044 |
| 9,804,717 B2 * | 10/2017 | Schropp, Jr. .......... G06F 3/0488 |
| 9,874,975 B2 | 1/2018 | Benbasat et al. |
| 9,880,655 B2 | 1/2018 | O'Connor |
| 9,886,141 B2 | 2/2018 | Yousefpor |
| 9,904,427 B1 * | 2/2018 | Co .......................... G06F 3/044 |
| 9,996,175 B2 | 6/2018 | Hotelling et al. |
| 10,001,888 B2 | 6/2018 | Hong et al. |
| 10,061,433 B2 * | 8/2018 | Imai ...................... G06F 3/041 |
| 10,175,832 B2 | 1/2019 | Roziere |
| 10,289,251 B2 | 5/2019 | Shih et al. |
| 10,365,764 B2 * | 7/2019 | Korapati ............... G06F 3/0418 |
| 2002/0015024 A1 | 2/2002 | Westerman et al. |
| 2002/0152048 A1 | 10/2002 | Hayes |
| 2003/0075427 A1 | 4/2003 | Caldwell |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0119701 A1 | 6/2004 | Mulligan et al. |

(56) References Cited

U.S. PATENT DOCUMENTS

| | | |
|---|---|---|
| 2004/0188151 A1 | 9/2004 | Gerpheide et al. |
| 2004/0239650 A1 | 12/2004 | Mackey |
| 2004/0243747 A1 | 12/2004 | Rekimoto |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0104867 A1 | 5/2005 | Westerman et al. |
| 2005/0126831 A1 | 6/2005 | Richter et al. |
| 2005/0146509 A1 | 7/2005 | Geaghan et al. |
| 2005/0219228 A1 | 10/2005 | Alameh et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0026521 A1 | 2/2006 | Hotelling et al. |
| 2006/0038791 A1 | 2/2006 | Mackey |
| 2006/0097991 A1 | 5/2006 | Hotelling et al. |
| 2006/0132463 A1 | 6/2006 | Lee et al. |
| 2006/0146484 A1 | 7/2006 | Kim et al. |
| 2006/0161871 A1 | 7/2006 | Hotelling et al. |
| 2006/0197753 A1 | 9/2006 | Hotelling |
| 2006/0202969 A1 | 9/2006 | Hauck |
| 2006/0227115 A1 | 10/2006 | Fry |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp |
| 2007/0279619 A1 | 12/2007 | Chang |
| 2007/0283832 A1 | 12/2007 | Hotelling |
| 2007/0285365 A1 | 12/2007 | Lee |
| 2007/0296709 A1 | 12/2007 | Guanghai |
| 2008/0006454 A1 | 1/2008 | Hotelling |
| 2008/0007533 A1 | 1/2008 | Hotelling |
| 2008/0012835 A1 | 1/2008 | Rimon et al. |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042985 A1 | 2/2008 | Katsuhito et al. |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0100572 A1 | 5/2008 | Boillot |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0174321 A1 | 7/2008 | Kang et al. |
| 2008/0180365 A1 | 7/2008 | Ozaki |
| 2008/0188267 A1 | 8/2008 | Sagong |
| 2008/0224962 A1 | 9/2008 | Kasai et al. |
| 2008/0231292 A1 | 9/2008 | Ossart et al. |
| 2008/0238871 A1 | 10/2008 | Tam |
| 2008/0246496 A1 | 10/2008 | Hristov et al. |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0009485 A1 | 1/2009 | Bytheway |
| 2009/0019344 A1 | 1/2009 | Yoon et al. |
| 2009/0020343 A1 | 1/2009 | Rothkopf et al. |
| 2009/0054107 A1 | 2/2009 | Feland, III et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091546 A1 | 4/2009 | Joo et al. |
| 2009/0091551 A1 | 4/2009 | Hotelling et al. |
| 2009/0109192 A1 | 4/2009 | Liu et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0141046 A1 | 6/2009 | Rathnam et al. |
| 2009/0160787 A1 | 6/2009 | Westerman et al. |
| 2009/0174676 A1 | 7/2009 | Westerman |
| 2009/0174688 A1 | 7/2009 | Westerman |
| 2009/0179868 A1 | 7/2009 | Ayres et al. |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey, IV et al. |
| 2009/0212642 A1 | 8/2009 | Krah |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0277695 A1 | 11/2009 | Liu et al. |
| 2009/0303189 A1 | 12/2009 | Grunthaner et al. |
| 2009/0309850 A1 | 12/2009 | Yang |
| 2009/0309851 A1 | 12/2009 | Bernstein |
| 2009/0314621 A1 | 12/2009 | Hotelling |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0004029 A1 | 1/2010 | Kim |
| 2010/0006350 A1 | 1/2010 | Elias |
| 2010/0007616 A1 | 1/2010 | Jang |
| 2010/0019779 A1 | 1/2010 | Kato et al. |
| 2010/0031174 A1 | 2/2010 | Kim |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0090964 A1 | 4/2010 | Soo et al. |
| 2010/0097346 A1 | 4/2010 | Sleeman |
| 2010/0102027 A1 | 4/2010 | Liu et al. |
| 2010/0110035 A1 | 5/2010 | Selker |
| 2010/0117985 A1 | 5/2010 | Wadia |
| 2010/0123667 A1 | 5/2010 | Kim et al. |
| 2010/0139991 A1 | 6/2010 | Philipp et al. |
| 2010/0143848 A1 | 6/2010 | Jain et al. |
| 2010/0149108 A1 | 6/2010 | Hotelling et al. |

(56) References Cited

U.S. PATENT DOCUMENTS

| | | |
|---|---|---|
| 2010/0149127 A1 | 6/2010 | Fisher et al. |
| 2010/0156810 A1 | 6/2010 | Barbier et al. |
| 2010/0156846 A1 | 6/2010 | Long et al. |
| 2010/0182018 A1 | 7/2010 | Hazelden |
| 2010/0182278 A1 | 7/2010 | Li |
| 2010/0194695 A1 | 8/2010 | Hotelling et al. |
| 2010/0194696 A1 | 8/2010 | Chang et al. |
| 2010/0194697 A1 | 8/2010 | Hotelling |
| 2010/0194698 A1 | 8/2010 | Hotelling et al. |
| 2010/0194707 A1 | 8/2010 | Hotelling et al. |
| 2010/0201635 A1 | 8/2010 | Klinghult et al. |
| 2010/0245286 A1 | 9/2010 | Parker |
| 2010/0253638 A1 | 10/2010 | Yousefpor et al. |
| 2010/0277418 A1 | 11/2010 | Huang et al. |
| 2010/0328228 A1 | 12/2010 | Elias |
| 2010/0328248 A1 | 12/2010 | Mozdzyn |
| 2010/0328262 A1 | 12/2010 | Huang et al. |
| 2010/0328263 A1 | 12/2010 | Lin |
| 2011/0001491 A1 | 1/2011 | Huang et al. |
| 2011/0006832 A1 | 1/2011 | Land et al. |
| 2011/0007020 A1 | 1/2011 | Hong et al. |
| 2011/0007021 A1 | 1/2011 | Bernstein et al. |
| 2011/0007030 A1 | 1/2011 | Mo et al. |
| 2011/0025623 A1 | 2/2011 | Lin |
| 2011/0025629 A1 | 2/2011 | Grivna et al. |
| 2011/0025635 A1 | 2/2011 | Lee |
| 2011/0061949 A1 | 3/2011 | Krah et al. |
| 2011/0074705 A1 | 3/2011 | Yousefpor et al. |
| 2011/0080391 A1 | 4/2011 | Brown et al. |
| 2011/0096016 A1 | 4/2011 | Yilmaz |
| 2011/0134050 A1 | 6/2011 | Harley |
| 2011/0157068 A1 | 6/2011 | Parker |
| 2011/0175846 A1 | 7/2011 | Wang et al. |
| 2011/0199105 A1 | 8/2011 | Otagaki et al. |
| 2011/0227874 A1 | 9/2011 | Faahraeus et al. |
| 2011/0231139 A1 | 9/2011 | Yokota |
| 2011/0234523 A1 | 9/2011 | Chang et al. |
| 2011/0241907 A1 | 10/2011 | Cordeiro |
| 2011/0248949 A1 | 10/2011 | Chang et al. |
| 2011/0254795 A1 | 10/2011 | Chen |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050206 A1 | 3/2012 | Welland |
| 2012/0050214 A1 | 3/2012 | Kremin |
| 2012/0050216 A1 | 3/2012 | Kremin et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0075239 A1 | 3/2012 | Azumi |
| 2012/0092288 A1 | 4/2012 | Wadia |
| 2012/0098776 A1 | 4/2012 | Chen |
| 2012/0113047 A1 | 5/2012 | Hanauer et al. |
| 2012/0146726 A1 | 6/2012 | Huang |
| 2012/0146920 A1 | 6/2012 | Lin et al. |
| 2012/0146942 A1 | 6/2012 | Kamoshida et al. |
| 2012/0154324 A1 | 6/2012 | Wright et al. |
| 2012/0162121 A1 | 6/2012 | Chang et al. |
| 2012/0162133 A1 | 6/2012 | Chen |
| 2012/0162134 A1 | 6/2012 | Chen |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0187965 A1 | 7/2012 | Roziere |
| 2012/0211264 A1 | 8/2012 | Milne |
| 2012/0249446 A1 | 10/2012 | Chen et al. |
| 2012/0262395 A1 | 10/2012 | Chan |
| 2012/0262410 A1 | 10/2012 | Lim |
| 2012/0287068 A1 | 11/2012 | Colgate et al. |
| 2012/0313881 A1 | 12/2012 | Ge et al. |
| 2012/0320385 A1 | 12/2012 | Mu et al. |
| 2013/0015868 A1 | 1/2013 | Peng |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1 | 2/2013 | Chang |
| 2013/0057511 A1 | 3/2013 | Shepelev et al. |
| 2013/0069911 A1 | 3/2013 | You |
| 2013/0076648 A1 | 3/2013 | Krah et al. |
| 2013/0093712 A1 | 4/2013 | Liu et al. |
| 2013/0100038 A1 | 4/2013 | Yilmaz et al. |
| 2013/0100071 A1 | 4/2013 | Wright |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0215049 A1 | 8/2013 | Lee |
| 2013/0224370 A1 | 8/2013 | Cok et al. |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0257798 A1 | 10/2013 | Tamura et al. |
| 2013/0265276 A1 | 10/2013 | Obeidat et al. |
| 2013/0271427 A1 | 10/2013 | Benbasat et al. |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0278543 A1* | 10/2013 | Hsu .................. G06F 3/044 345/174 |
| 2013/0307821 A1 | 11/2013 | Kogo |
| 2013/0314342 A1 | 11/2013 | Kim |
| 2013/0320994 A1 | 12/2013 | Brittain |
| 2013/0321289 A1 | 12/2013 | Dubery et al. |
| 2013/0328759 A1 | 12/2013 | Al-Dahle et al. |
| 2013/0342479 A1 | 12/2013 | Pyo et al. |
| 2014/0002406 A1 | 1/2014 | Cormier et al. |
| 2014/0009438 A1 | 1/2014 | Liu et al. |
| 2014/0022186 A1 | 1/2014 | Hong et al. |
| 2014/0022201 A1 | 1/2014 | Boychuk |
| 2014/0043546 A1 | 2/2014 | Yamazaki et al. |
| 2014/0070823 A1 | 3/2014 | Roziere |
| 2014/0071084 A1 | 3/2014 | Sugiura |
| 2014/0078096 A1 | 3/2014 | Tan et al. |
| 2014/0098051 A1 | 4/2014 | Hong et al. |
| 2014/0104194 A1 | 4/2014 | Davidson et al. |
| 2014/0104225 A1* | 4/2014 | Davidson .............. G06F 3/044 345/174 |
| 2014/0104228 A1 | 4/2014 | Chen et al. |
| 2014/0111707 A1 | 4/2014 | Song et al. |
| 2014/0118270 A1 | 5/2014 | Moses |
| 2014/0125628 A1 | 5/2014 | Yoshida et al. |
| 2014/0132534 A1 | 5/2014 | Kim |
| 2014/0132560 A1 | 5/2014 | Huang et al. |
| 2014/0132860 A1 | 5/2014 | Hotelling et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0160376 A1 | 6/2014 | Wang et al. |
| 2014/0168540 A1 | 6/2014 | Wang et al. |
| 2014/0192027 A1 | 7/2014 | Ksondzyk et al. |
| 2014/0204043 A1 | 7/2014 | Lin et al. |
| 2014/0204058 A1 | 7/2014 | Huang et al. |
| 2014/0210779 A1 | 7/2014 | Katsuta et al. |
| 2014/0232955 A1 | 8/2014 | Roudbari et al. |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267128 A1 | 9/2014 | Bulea et al. |
| 2014/0267146 A1 | 9/2014 | Chang et al. |
| 2014/0267165 A1 | 9/2014 | Roziere |
| 2014/0285469 A1 | 9/2014 | Wright et al. |
| 2014/0306924 A1 | 10/2014 | Lin |

(56) References Cited

U.S. PATENT DOCUMENTS

| | | |
|---|---|---|
| 2014/0347574 A1 | 11/2014 | Tung et al. |
| 2014/0354301 A1 | 12/2014 | Trend |
| 2014/0362030 A1 | 12/2014 | Mo et al. |
| 2014/0362034 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0009421 A1 | 1/2015 | Choi |
| 2015/0015528 A1 | 1/2015 | Vandermeijden |
| 2015/0026398 A1 | 1/2015 | Kim |
| 2015/0042600 A1 | 2/2015 | Lukanc et al. |
| 2015/0042607 A1 | 2/2015 | Takanohashi |
| 2015/0049043 A1 | 2/2015 | Yousefpor |
| 2015/0049044 A1 | 2/2015 | Yousefpor |
| 2015/0077375 A1 | 3/2015 | Hotelling et al. |
| 2015/0091587 A1 | 4/2015 | Shepelev et al. |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0227240 A1 | 8/2015 | Hong et al. |
| 2015/0242028 A1 | 8/2015 | Roberts et al. |
| 2015/0248177 A1 | 9/2015 | Maharyta |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0309610 A1 | 10/2015 | Rabii et al. |
| 2015/0324035 A1* | 11/2015 | Yuan ............... G06F 3/0416 345/174 |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0011702 A1 | 1/2016 | Shih |
| 2016/0018348 A1 | 1/2016 | Yau et al. |
| 2016/0022218 A1 | 1/2016 | Hayes et al. |
| 2016/0034102 A1 | 2/2016 | Roziere et al. |
| 2016/0041629 A1 | 2/2016 | Rao |
| 2016/0048234 A1 | 2/2016 | Chandran et al. |
| 2016/0062533 A1 | 3/2016 | O'Connor |
| 2016/0077667 A1 | 3/2016 | Chiang |
| 2016/0139728 A1 | 5/2016 | Jeon et al. |
| 2016/0154505 A1 | 6/2016 | Chang |
| 2016/0154529 A1 | 6/2016 | Westerman |
| 2016/0170533 A1 | 6/2016 | Roziere |
| 2016/0195954 A1 | 7/2016 | Wang et al. |
| 2016/0216808 A1 | 7/2016 | Hotelling et al. |
| 2016/0224177 A1 | 8/2016 | Krah |
| 2016/0224189 A1 | 8/2016 | Yousefpor et al. |
| 2016/0246423 A1 | 8/2016 | Fu |
| 2016/0253041 A1* | 9/2016 | Park ............... G06F 3/0418 345/174 |
| 2016/0259448 A1* | 9/2016 | Guarneri ............... G06F 3/0418 |
| 2016/0266676 A1 | 9/2016 | Wang et al. |
| 2016/0266679 A1 | 9/2016 | Shahparnia et al. |
| 2016/0282980 A1* | 9/2016 | Chintalapoodi ...... G06F 3/0416 |
| 2016/0283023 A1 | 9/2016 | Shin et al. |
| 2016/0299603 A1 | 10/2016 | Tsujioka et al. |
| 2016/0357344 A1 | 12/2016 | Benbasat et al. |
| 2017/0060318 A1 | 3/2017 | Gu et al. |
| 2017/0090619 A1 | 3/2017 | Yousefpor |
| 2017/0090622 A1 | 3/2017 | Badaye et al. |
| 2017/0097703 A1 | 4/2017 | Lee |
| 2017/0108968 A1 | 4/2017 | Roziere |
| 2017/0139539 A1 | 5/2017 | Yao et al. |
| 2017/0168626 A1 | 6/2017 | Konicek |
| 2017/0220156 A1 | 8/2017 | Blondin et al. |
| 2017/0229502 A1 | 8/2017 | Liu |
| 2017/0269729 A1* | 9/2017 | Chintalapoodi ...... G01N 27/223 |
| 2017/0285804 A1 | 10/2017 | Yingxuan et al. |
| 2017/0315646 A1 | 11/2017 | Roziere |
| 2017/0357371 A1* | 12/2017 | Kim ............... G06F 3/0418 |
| 2018/0067584 A1 | 3/2018 | Zhu et al. |
| 2018/0275824 A1 | 9/2018 | Li et al. |
| 2018/0307375 A1 | 10/2018 | Shah et al. |
| 2019/0034032 A1 | 1/2019 | Westerman |
| 2019/0138152 A1 | 5/2019 | Yousefpor et al. |

FOREIGN PATENT DOCUMENTS

| | | |
|---|---|---|
| CN | 1527274 A | 9/2004 |
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101419516 A | 4/2009 |
| CN | 201218943 Y | 4/2009 |
| CN | 101840293 A | 9/2010 |
| CN | 102023768 A | 4/2011 |
| CN | 102411460 A | 4/2012 |
| CN | 103049148 A | 4/2013 |
| CN | 103052930 A | 4/2013 |
| CN | 103221910 A | 7/2013 |
| CN | 103294321 A | 9/2013 |
| CN | 103365500 A | 10/2013 |
| CN | 103365506 A | 10/2013 |
| CN | 103809810 A | 5/2014 |
| CN | 104020908 A | 9/2014 |
| CN | 102648446 B | 1/2016 |
| CN | 105474154 A | 4/2016 |
| DE | 11 2008 001 245 T5 | 3/2010 |
| DE | 102011089693 A1 | 6/2013 |
| DE | 102011089693 T5 | 8/2014 |
| EP | 0 853 230 A1 | 7/1998 |
| EP | 1 192 585 A1 | 4/2002 |
| EP | 1 192 585 B1 | 4/2002 |
| EP | 1 573 706 A2 | 2/2004 |
| EP | 1 573 706 A3 | 2/2004 |
| EP | 1 455 264 A2 | 9/2004 |
| EP | 1 455 264 A3 | 9/2004 |
| EP | 1 644 918 A2 | 12/2004 |
| EP | 1 717 677 A2 | 11/2006 |
| EP | 1 717 677 A3 | 11/2006 |
| EP | 1918803 A1 | 11/2006 |
| EP | 1745356 A2 | 1/2007 |
| EP | 1 986 084 A1 | 10/2008 |
| EP | 2 077 489 A1 | 7/2009 |
| EP | 2144146 A1 | 1/2010 |
| EP | 2148264 A2 | 1/2010 |
| EP | 2224277 A1 | 9/2010 |
| EP | 2 256 606 A2 | 12/2010 |
| EP | 1455264 B1 | 5/2011 |
| FR | 2756048 A1 | 5/1998 |
| FR | 2896595 A1 | 7/2007 |
| FR | 2949008 A1 | 2/2011 |
| FR | 3004551 A1 | 10/2014 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 10-505183 A | 5/1998 |
| JP | 2000-163031 A | 6/2000 |
| JP | 3134925 B2 | 2/2001 |
| JP | 2002-342033 A | 11/2002 |
| JP | 2003-066417 A | 3/2003 |
| JP | 2004-503835 A | 2/2004 |
| JP | 2004-526265 A | 8/2004 |
| JP | 2005030901 A | 2/2005 |
| JP | 2005-084128 A | 3/2005 |
| JP | 2005-301373 A | 10/2005 |
| JP | 2006-251927 A | 9/2006 |
| JP | 2007-018515 A | 1/2007 |
| JP | 2008-510251 A | 4/2008 |
| JP | 2008-117371 A | 5/2008 |

(56) References Cited

FOREIGN PATENT DOCUMENTS

| | | |
|---|---|---|
| JP | 2008-225415 A | 9/2008 |
| JP | 2009-86240 A | 4/2009 |
| JP | 2009-157373 A | 7/2009 |
| JP | 2010-528186 A | 8/2010 |
| KR | 10-2004-0002983 A | 1/2004 |
| KR | 10-20040091728 A | 10/2004 |
| KR | 10-20070002327 A | 1/2007 |
| KR | 10-2008-0019125 A | 3/2008 |
| KR | 10-2008-0041278 A | 5/2008 |
| KR | 10-2011-0044670 A | 4/2011 |
| KR | 10-2012-0085737 A | 8/2012 |
| KR | 10-2013-0094495 A | 8/2013 |
| KR | 10-2013-0117499 A | 10/2013 |
| KR | 10-2014-0074454 A | 6/2014 |
| KR | 10-1609992 B1 | 4/2016 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |
| TW | M344544 | 11/2008 |
| TW | M352721 U | 3/2009 |
| TW | 201115442 A1 | 5/2011 |
| TW | 201203069 A | 1/2012 |
| TW | 201401129 A | 1/2014 |
| TW | 201419071 A | 5/2014 |
| WO | WO-99/35633 A2 | 7/1999 |
| WO | 1999/035633 A3 | 9/1999 |
| WO | 2000/073984 A1 | 12/2000 |
| WO | WO-01/097204 A1 | 12/2001 |
| WO | 2002/080637 A1 | 10/2002 |
| WO | 2003/079176 A2 | 9/2003 |
| WO | 2004/013833 A2 | 2/2004 |
| WO | 2004/114265 A2 | 12/2004 |
| WO | 2004/013833 A3 | 8/2005 |
| WO | WO-2005/114369 A2 | 12/2005 |
| WO | WO-2005/114369 A3 | 12/2005 |
| WO | WO-2006/020305 A2 | 2/2006 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | 2006/126703 A2 | 11/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | 2006/020305 A3 | 5/2007 |
| WO | 2007/054018 A1 | 5/2007 |
| WO | WO-2007/066488 A1 | 6/2007 |
| WO | WO-2007/089766 A2 | 8/2007 |
| WO | WO-2007/115032 A2 | 10/2007 |
| WO | 2007/146780 A2 | 12/2007 |
| WO | WO-2007/146785 A2 | 12/2007 |
| WO | WO-2007/146785 A3 | 12/2007 |
| WO | 2007/115032 A3 | 1/2008 |
| WO | 2008/000964 A1 | 1/2008 |
| WO | WO-2008/007118 A2 | 1/2008 |
| WO | WO-2008/007118 A3 | 1/2008 |
| WO | 2008/030780 A1 | 3/2008 |
| WO | WO-2008/047990 A1 | 4/2008 |
| WO | WO-2008/076237 A2 | 6/2008 |
| WO | 2008/076237 A3 | 8/2008 |
| WO | 2007/089766 A3 | 9/2008 |
| WO | 2007/146780 A3 | 9/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | 2011/015795 A2 | 2/2011 |
| WO | 2011/071784 A1 | 6/2011 |
| WO | 2011/015795 A3 | 7/2011 |
| WO | WO-2011/137200 A1 | 11/2011 |
| WO | 2013/093327 A1 | 6/2013 |
| WO | WO-2013/158570 A1 | 10/2013 |
| WO | 2014105942 A1 | 7/2014 |
| WO | WO-2014/127716 A1 | 8/2014 |
| WO | WO-2015/017196 A1 | 2/2015 |
| WO | WO-2015/023410 A1 | 2/2015 |
| WO | WO-2015/072722 A1 | 5/2015 |
| WO | WO-2015/107969 A1 | 7/2015 |
| WO | WO-2015/178920 A1 | 11/2015 |
| WO | WO-2016/048269 A1 | 3/2016 |
| WO | 2016/066282 A1 | 5/2016 |
| WO | WO-2016/069642 A1 | 5/2016 |
| WO | WO-2016/126525 A1 | 8/2016 |
| WO | WO-2016/144437 A1 | 9/2016 |
| WO | 2017058413 A1 | 4/2017 |
| WO | WO-2017/058415 A1 | 4/2017 |

OTHER PUBLICATIONS

Notice of Allowance dated Feb. 9, 2018, for U.S. Appl. No. 14/550,686, filed Nov. 21, 2014, 11 pages.
Notice of Allowance dated Mar. 1, 2018, for U.S. Appl. No. 14/645,120, filed Mar. 11, 2015, five pages.
Final Office Action dated Jul. 27, 2018, for U.S. Appl. No. 15/097,179, filed Apr. 12, 2016, 11 pages.
Non-Final Office Action dated Jun. 20, 2018, for U.S. Appl. No. 15/009,774, filed Jan. 28, 2016, 17 pages.
Non-Final Office Action dated Sep. 14, 2017, for U.S. Appl. No. 15/017,463, filed Feb. 5, 2016, 22 pages.
Notice of Allowance dated Sep. 20, 2017, for U.S. Appl. No. 14/082,003, filed Nov. 15, 2013, eight pages.
Notice of Allowance dated Sep. 20, 2017, for U.S. Appl. No. 15/144,706, filed May 2, 2016, nine pages.
Final Office Action dated Dec. 5, 2017, for U.S. Appl. No. 15/006,987, filed Jan. 26, 2016, 16 pages.
Non-Final Office Action dated Dec. 22, 2017, for U.S. Appl. No. 14/993,017, filed Jan. 11, 2016, 23 pages.
Non-Final Office Action dated Jan. 22, 2018, for U.S. Appl. No. 15/097,179, filed Apr. 12, 2016, 11 pages.
Non-Final Office Action dated Dec. 21, 2018, for U.S. Appl. No. 15/313,549, filed Nov. 22, 2016, thirteen pages.
Non-Final Office Action dated Jan. 2, 2019, for U.S. Appl. No. 15/522,737, filed Apr. 27, 2017, thirteen pages.
Non-Final Office Action dated Jan. 18, 2019, for U.S. Appl. No. 14/993,017, filed Jan. 11, 2016, 34 pages.
Non-Final Office Action dated Jan. 18, 2019, for U.S. Appl. No. 15/087,956, filed Mar. 31, 2016, twelve pages.
Notice of Allowance dated Dec. 31, 2018, for U.S. Appl. No. 14/318,157, filed Jun. 27, 2014, eight pages.
Final Office Action dated Feb. 6, 2019, for U.S. Appl. No. 15/009,774, filed Jan. 28, 2016, fifteen pages.
Non-Final Office Action dated Feb. 11, 2019, for U.S. Appl. No. 15/507,722, filed Feb. 28, 2017, fifteen pages.
Notice of Allowance dated Oct. 3, 2017, for U.S. Appl. No. 14/082,003, filed Nov. 15, 2013, nine pages.
Notice of Allowance dated Oct. 13, 2017, for U.S. Appl. No. 14/558,529, filed Dec. 2, 2014, eight pages.
Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.
Chinese Search Report completed Dec. 14, 2011, for CN Patent Application No. ZL201020108330X, filed Feb. 2, 2010, with English Translation, 12 pages.
Chinese Search Report completed May 18, 2015, for CN Patent Application No. 201310042816.6, filed Feb. 2, 2010, two pages.
European Search Report dated Jul. 21, 2010, for EP Patent Application 10151969.2, three pages.
European Search Report dated Apr. 25, 2012, for EP Patent Application No. 08022505.5, 12 pages.
European Search Report dated Dec. 3, 2012, for EP Patent Application No. 12162177.5, seven pages.

(56) References Cited

OTHER PUBLICATIONS

European Search Report dated Feb. 13, 2013, for EP Patent Application No. 12192450.0, six pages.
European Search Report dated Aug. 31, 2015, for EP Application No. 15166813.4, eight pages.
European Search Report dated Jul. 27, 2017, for EP Application No. 14902458.0, four pages.
Final Office Action dated Jan. 5, 2012, for U.S. Appl. No. 12/206,680, filed Sep. 8, 2008, 15 pages.
Final Office Action dated Jan. 3, 2013, for U.S. Appl. No. 11/818,498, filed Jun. 13, 2007, 17 pages.
Final Office Action dated Feb. 1, 2013, for U.S. Appl. No. 12/642,466, filed Dec. 18, 2009, nine pages.
Final Office Action dated Feb. 5, 2013, for U.S. Appl. No. 12/500,911, filed Jul. 10, 2009, 15 pages.
Final Office Action dated Apr. 30, 2013, for U.S. Appl. No. 12/494,173, filed Jun. 29, 2009, 7 pages.
Final Office Action dated May 22, 2013, for U.S. Appl. No. 12/206,680, filed Sep. 8, 2008, 16 pages.
Final Office Action dated Jun. 21, 2013, for U.S. Appl. No. 12/545,754, filed Aug. 21, 2009, 6 pages.
Final Office Action dated Jul. 19, 2013, for U.S. Appl. No. 12/545,604, filed Aug. 21, 2009, 17 pages.
Final Office Action dated Aug. 12, 2013, for U.S. Appl. No. 12/238,333, filed Sep. 25, 2008, 19 pages.
Final Office Action dated Aug. 13, 2013, for U.S. Appl. No. 12/238,342, filed Sep. 25, 2008, 14 pages.
Final Office Action dated Jan. 27, 2014, for U.S. Appl. No. 12/206,680, filed Sep. 8, 2008, 20 pages.
Final Office Action dated Apr. 23, 2014 for U.S. Appl. No. 12/847,987, filed Jul. 30, 2010, 16 pages.
Final Office Action dated May 9, 2014, for U.S. Appl. No. 12/642,466, filed Dec. 18, 2009, 13 pages.
Final Office Action dated Jul. 16, 2014, for U.S. Appl. No. 12/545,604, filed Aug. 21, 2009, 18 pages.
Final Office Action dated Oct. 22, 2014, for U.S. Appl. No. 12/238,342, filed Sep. 25, 2008, 16 pages.
Final Office Action dated Oct. 22, 2014, for U.S. Appl. No. 13/448,182, filed Apr. 16, 2012, 11 pages.
Final Office Action dated Apr. 22, 2015, for U.S. Appl. No. 12/238,333, filed Sep. 25, 2008, 23 pages.
Final Office Action dated Jun. 11, 2015, for U.S. Appl. No. 13/448,182, filed Apr. 16, 2012, 12 pages.
Final Office Action dated Nov. 12, 2015, for U.S. Appl. No. 14/082,074, filed Nov. 15, 2013, 22 pages.
Final Office Action dated Jan. 4, 2016, for U.S. Appl. No. 14/082,003, filed Nov. 15, 2013, 25 pages.
Final Office Action dated Jan. 29, 2016, for U.S. Appl. No. 12/642,466, filed Dec. 18, 2009, nine pages.
Final Office Action dated Apr. 8, 2016, for U.S. Appl. No. 13/899,391, filed May 21, 2013, ten pages.
Final Office Action dated May 9, 2016, for U.S. Appl. No. 14/318,157, filed Jun. 27, 2014, ten pages.
Final Office Action dated May 27, 2016, for U.S. Appl. No. 14/645,120, filed Mar. 11, 2015, twelve pages.
Final Office Action dated Jun. 14, 2016, for U.S. Appl. No. 14/550,686, filed Nov. 21, 2014, ten pages.
Final Office Action dated Sep. 29, 2016, for U.S. Appl. No. 14/558,529, filed Dec. 2, 2014, 22 pages.
Final Office Action dated Nov. 4, 2016, for U.S. Appl. No. 14/082,003, filed Nov. 15, 2013, 18 pages.
Final Office Action dated Jul. 26, 2017, for U.S. Appl. No. 14/318,157, filed Jun. 27, 2014, 10 pages.
Final Office Action dated Aug. 10, 2017, for U.S. Appl. No. 14/645,120, filed Mar. 11, 2015, twelve pages.
Final Office Action dated Aug. 21, 2017, for U.S. Appl. No. 14/550,686, filed Nov. 21, 2014, 11 pages.
International Search Report dated Mar. 10, 2010, for PCT Application No. PCT/US2010/22868, filed Feb. 2, 2010, three pages.
International Search Report dated Jan. 14, 2011, for PCT Application No. PCT/US2010/029698, filed Apr. 1, 2010, 4 pages.
International Search Report dated May 2, 2011, for PCT Application No. PCT/US2010/058988, filed Dec. 3, 2010, five pages.
International Search Report dated Aug. 6, 2013, for PCT Application No. PCT/US2013/036662, filed Apr. 15, 2013, three pages.
International Search Report dated Jan. 29, 2015, for PCT Application No. PCT/US2014/047888, filed Jul. 23, 2014, six pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04, ACM* pp. 289-296.
Non-Final Office Action dated Feb. 4, 2011, for U.S. Appl. No. 12/038,760, filed Feb. 27, 2008, 18 pages.
Non-Final Office Action dated Jun. 9, 2011, for U.S. Appl. No. 12/206,680, filed Sep. 8, 2008, 13 pages.
Non-Final Office Action dated Mar. 9, 2012, for U.S. Appl. No. 12/238,342, filed Sep. 25, 2008, 26 pages.
Non-Final Office Action dated May 3, 2012, for U.S. Appl. No. 12/238,333, filed Sep. 25, 2008, 22 pages.
Non-Final Office Action dated May 25, 2012, for U.S. Appl. No. 11/818,498, filed Jun. 13, 2007, 16 pages.
Non-Final Office Action dated Jun. 7, 2012, for U.S. Appl. No. 12/500,911, filed Jul. 10, 2009, 16 pages.
Non-Final Office Action dated Aug. 28, 2012, for U.S. Appl. No. 12/642,466, filed Dec. 18, 2009, nine pages.
Non-Final Office Action dated Sep. 26, 2012, for U.S. Appl. No. 12/206,680, filed Sep. 8, 2008, 14 pages.
Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Nov. 28, 2012, for U.S. Appl. No. 12/494,173, filed Jun. 29, 2009, six pages.
Non-Final office Action dated Jan. 7, 2013, for U.S. Appl. No. 12/545,604, filed Aug. 21, 2009, 12 pages.
Non-Final Office Action dated Jan. 7, 2013, for U.S. Appl. No. 12/238,333, filed Sep. 25, 2008, 20 pages.
Non-Final Office Action dated Feb. 15, 2013, for U.S. Appl. No. 12/238,342, filed Sep. 25, 2008, 15 pages.
Non-Final Office Action dated Mar. 29, 2013 for U.S. Appl. No. 13/737,779, filed Jan. 9, 2013, nine pages.
Non-Final Office Action dated Sep. 6, 2013, for U.S. Appl. No. 12/847,987, filed Jul. 30, 2010, 15 pages.
Non-Final Office Action dated Sep. 10, 2013, for U.S. Appl. No. 12/545,754, filed Aug. 21, 2009, six pages.
Non-Final Office Action dated Sep. 30, 2013, for U.S. Appl. No. 12/206,680, filed Sep. 8, 2008, 18 pages.
Non-Final Office Action dated Nov. 8, 2013, for U.S. Appl. No. 12/642,466, filed Dec. 18, 2009, 12 pages.
Non-Final Office Action dated Dec. 19, 2013, for U.S. Appl. No. 12/545,604, filed Aug. 21, 2009, 17 pages.
Non-Final Office Action dated Jan. 2, 2014, for U.S. Appl. No. 12/545,754, filed Aug. 21, 2009, 11 pages.
Non-Final Office Action dated Jan. 3, 2014 , for U.S. Appl. No. 12/545,557, filed Aug. 21, 2009, 9 pages.
Non-Final Office Action dated Jan. 31, 2014, for U.S. Appl. No. 13/448,182, filed Apr. 16, 2012, 18 pages.
Non-Final Office Action dated Mar. 12, 2014, for U.S. Appl. No. 12/238,342, filed Sep. 25, 2008, 15 pages.
Non-Final Office Action dated Apr. 10, 2014, for U.S. Appl. No. 14/055,717, filed Oct. 16, 2013, 10 pages.
Non-Final Office Action dated Sep. 18, 2014, for U.S. Appl. No. 12/238,333, filed Sep. 25, 2008, 21 pages.
Non-Final Office Action dated Apr. 10, 2015, for U.S. Appl. No. 14/082,074, filed Nov. 15, 2013, 23 pages.

(56) References Cited

OTHER PUBLICATIONS

Non-Final Office Action dated May 4, 2015, for U.S. Appl. No. 12/642,466, filed Dec. 18, 2009, nine pages.
Non-Final Office Action dated May 8, 2015, for U.S. Appl. No. 14/082,003, filed Nov. 15, 2013, 25 pages.
Non-Final Office Action dated Aug. 20, 2015, for U.S. Appl. No. 14/550,686, filed Nov. 21, 2014, ten pages.
Non-Final Office Action dated Oct. 5, 2015, for U.S. Appl. No. 13/899,391, filed May 21, 2013, ten pages.
Non-Final Office Action dated Oct. 6, 2015, for U.S. Appl. No. 14/318,157, filed Jun. 27, 2014, seven pages.
Non-Final Office Action dated Oct. 27, 2015, for U.S. Appl. No. 14/645,120, filed Mar. 11, 2015, eight pages.
Non-Final Office Action dated Apr. 14, 2016, for U.S. Appl. No. 14/558,529, filed Dec. 2, 2014, twenty pages.
Non-Final Office Action dated May 25, 2016, for U.S. Appl. No. 14/082,003, filed Nov. 15, 2013, 23 pages.
Non-Final Office Action dated Jun. 1, 2016, for U.S. Appl. No. 14/615,186, filed Feb. 5, 2015, eight pages.
Non-Final Office Action dated Dec. 14, 2016, for U.S. Appl. No. 14/550,686, filed Nov. 21, 2014, eight pages.
Non-Final Office Action dated Dec. 16, 2016, for U.S. Appl. No. 14/645,120, filed Mar. 11, 2015, ten pages.
Non-Final Office Action dated Dec. 19, 2016, for U.S. Appl. No. 14/318,157, filed Jun. 27, 2014, eleven pages.
Non-Final Office Action dated Mar. 13, 2017, for U.S. Appl. No. 14/082,003, filed Nov. 15, 2013, 20 pages.
Non-Final Office Action dated Apr. 7, 2017, for U.S. Appl. No. 15/144,706, filed May 2, 2016, eight pages.
Non-Final Office Action dated Jun. 14, 2017, for U.S. Appl. No. 15/006,987, filed Jan. 26, 2016, 14 pages.
Non-Final Office Action dated Jun. 26, 2017, for U.S. Appl. No. 14/558,529, filed Dec. 2, 2014, six pages.
Notice of Allowance dated Jun. 10, 2013, for U.S. Appl. No. 12/545,557, filed Aug. 21, 2009, 9 pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Notice of Allowance dated Apr. 11, 2014, for U.S. Appl. No. 12/545,557, filed Aug. 21, 2009, 9 pages.
Notice of Allowance dated Aug. 21, 2014, for U.S. Appl. No. 12/545,754, filed Aug. 21, 2009, ten pages.
Notice of Allowance dated Oct. 15, 2014, for U.S. Appl. No. 12/494,173, filed Jun. 29, 2009, eight pages.
Notice of Allowance dated Nov. 7, 2014, for U.S. Appl. No. 14/055,717, filed Oct. 16, 2013, six pages.
Notice of Allowance dated Mar. 16, 2015, for U.S. Appl. No. 14/312,489, filed Jun. 23, 2014, eight pages.
Notice of Allowance dated Dec. 1, 2015, for U.S. Appl. No. 12/238,333, filed Sep. 25, 2008, nine pages.
Notice of Allowance dated Jan. 8, 2016, for U.S. Appl. No. 13/448,182, filed Apr. 16, 2012, nine pages.
Notice of Allowance dated Dec. 2, 2016, for U.S. Appl. No. 14/615,186, filed Feb. 5, 2015, seven pages.
Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-120.].
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Apr. 29, 2009, for NL Application No. 2001672, with English translation of Written Opinion, eight pages.
Search Report dated Oct. 14, 2015, for TW Application No. 103116003, one page.
Search Report dated Nov. 12, 2015, for ROC (Taiwan) Patent Application No. 103105965, with English translation, two pages.

TW Search Report dated May 3, 2016, for TW Application No. 104115152, one page.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Wilson, A.D. (Oct. 15, 2006). "Robust Computer Vision-Based Detection of Pinching for One and Two-Handed Gesture Input," *ACM, USIT* '06, Montreux, Switzerland, Oct. 15-18, 2006, pp. 255-258.
Yang, J-H. et al. (Jul. 2013). "A Noise-Immune High-Speed Readout Circuit for In-Cell Touch Screen Panels," *IEEE Transactions on Circuits and Systems—1: Regular Papers* 60(7):1800-1809.
Final Office Action dated Aug. 16, 2018, for U.S. Appl. No. 14/993,017, filed Jan. 11, 2016, 35 pages.
Final Office Action dated May 14, 2018, for U.S. Appl. No. 15/006,987, filed Jan. 26, 2016, 11 pages.
Final Office Action dated May 17, 2018, for U.S. Appl. No. 15/017,463, filed Feb. 5, 2016, 22 pages.
Non-Final Office Action dated Apr. 3, 2018, for U.S. Appl. No. 14/318,157, filed Jun. 27, 2014, twelve pages.
Notice of Allowance dated Mar. 11, 2019, for U.S. Appl. No. 15/087,956, filed Mar. 31, 2016, ten pages.
Notice of Allowance dated Apr. 3, 2019, for U.S. Appl. No. 15/687,078, filed Aug. 25, 2017, eight pages.
Advisory Action received for U.S. Appl. No. 11/818,498, dated May 17, 2013, 5 pages.
Advisory Action received for U.S. Appl. No. 11/818,498, dated Oct. 14, 2011, 5 pages.
Advisory Action received for U.S. Appl. No. 12/206,680, dated Apr. 16, 2012, 3 pages.
Advisory Action received for U.S. Appl. No. 12/238,333, dated Dec. 17, 2013, 3 pages.
Advisory Action received for U.S. Appl. No. 12/238,333, dated Oct. 21, 2015, 4 pages.
Advisory Action received for U.S. Appl. No. 12/500,911, dated May 17, 2013, 3 pages.
Advisory Action received for U.S. Appl. No. 12/642,466, dated May 23, 2013, 2 pages.
Advisory Action received for U.S. Appl. No. 14/082,003, dated Mar. 10, 2016, 3 pages.
Advisory Action received for U.S. Appl. No. 14/645,120, dated Nov. 25, 2016, 3 pages.
Advisory Action received for U.S. Appl. No. 15/017,463, dated Aug. 8, 2018, 3 pages.
Connor, Todd, "mTouch Projected Capacitive Touch Screen Sensing Theory of Operation", Microchip TB3064, Microchip Technology Inc., 2010, pp. 1-16.
Decision to Grant received for European Patent Application No. 16704768.7, dated May 23, 2019, 1 page.
Final Office Action received for U.S. Appl. No. 11/818,498, dated Jun. 10, 2011, 16 pages.
Final Office Action received for U.S. Appl. No. 14/997,031, dated Jun. 14, 2018, 19 pages.
Final Office Action received for U.S. Appl. No. 15/090,555, dated Aug. 29, 2018, 18 pages.
Final Office Action received for U.S. Appl. No. 15/228,942, dated Apr. 17, 2019, 9 pages.
Final Office Action received for U.S. Appl. No. 15/313,549, dated Dec. 18, 2019, 24 pages.
Final Office Action received for U.S. Appl. No. 15/507,722, dated Sep. 13, 2019, 18 pages.
Final Office Action received for U.S. Appl. No. 15/522,737, dated Sep. 12, 2019, 15 pages.
Final Office Action received for U.S. Appl. No. 16/201,730, dated Nov. 1, 2019, 11 pages.
First Action Interview received for U.S. Appl. No. 15/228,942, dated Nov. 26, 2018, 5 pages.
Gibilisco, Stan, The Illustrated Dictionary of Electronics, Eighth Edition, 2001, p. 173.
Intention to Grant received for European Patent Application No. 15166813.4, dated Sep. 20, 2019, 8 pages.

(56) References Cited

OTHER PUBLICATIONS

International Preliminary Report on Patentability received for PCT Patent Application No. PCT/US2010/022868, dated Jan. 27, 2011, 10 pages.
International Search Report received for PCT Patent Application No. PCT/US2014/039245, dated Sep. 24, 2014, 3 pages.
International Search Report received for PCT Patent Application No. PCT/US2014/056795, dated Dec. 12, 2014, 3 pages.
International Search Report received for PCT Patent Application No. PCT/US2015/057644, dated Jan. 8, 2016, 3 pages.
Non-Final Office Action received for U.S. Appl. No. 11/818,498, dated Dec. 13, 2010, 16 pages.
Non-Final Office Action received for U.S. Appl. No. 15/009,774, dated Sep. 4, 2019, 18 pages.
Non-Final Office Action received for U.S. Appl. No. 15/017,463, dated May 15, 2019, 20 pages.
Non-Final Office Action received for U.S. Appl. No. 15/313,549, dated Jul. 10, 2019, 25 pages.
Non-Final Office Action received for U.S. Appl. No. 16/152,326, dated Aug. 14, 2019, 12 pages.
Non-Final Office Action received for U.S. Appl. No. 16/201,730, dated May 10, 2019, 9 pages.
Notice of Allowance received for Taiwanese Patent Application No. 103116003, dated May 24, 2019, 3 pages (Official Copy only).
Notice of Allowance received for U.S. Appl. No. 12/545,604, dated Oct. 5, 2015, 9 pages.
Notice of Allowance received for U.S. Appl. No. 14/993,017, dated Jul. 12, 2019, 10 pages.
Notice of Allowance received for U.S. Appl. No. 15/090,555, dated Feb. 12, 2019, 7 pages.
Notice of Allowance received for U.S. Appl. No. 15/228,942, dated Aug. 30, 2019, 12 pages.
Notice of Allowance received for U.S. Appl. No. 15/691,283, dated Jun. 5, 2019, 10 pages.
Notification of Grant received for Korean Patent Application No. 10-2016-7003645, dated May 31, 2019, 3 pages (1 page of English Translation and 2 pages of Official Copy).
Notification to Grant received for Chinese Patent Application No. 201610790093.1, dated Apr. 30, 2019, 4 pages (2 pages of English Translation and 2 page of Official Copy).
Office Action received for Australian Patent Application No. 2019200698, dated Nov. 23, 2019, 3 pages.
Office Action received for Chinese Patent Application No. 201480081612.6, dated Jun. 4, 2019, 22 pages (11 of English Translation and 11 pages of Official Copy).
Office Action received for Chinese Patent Application No. 201580058366.7, dated May 28, 2019, 19 pages (10 pages of English Translation and 9 pages of Official Copy).
Office Action received for Chinese Patent Application No. 201680012966.4, dated Nov. 1, 2019, 19 pages (10 pages of English Translation and 9 pages of Official copy).
Preinterview First Office Action received for U.S. Appl. No. 15/228,942, dated Sep. 13, 2018, 4 pages.
Restriction Requirement received for U.S. Appl. No. 12/238,333, dated Mar. 8, 2012, 6 pages.
Restriction Requirement received for U.S. Appl. No. 12/494,173, dated Aug. 8, 2012, 5 pages.
Restriction Requirement received for U.S. Appl. No. 13/899,391, dated Apr. 8, 2015, 6 pages.
Restriction Requirement received for U.S. Appl. No. 15/087,956, dated Feb. 13, 2018, 8 pages.
Restriction Requirement received for U.S. Appl. No. 15/097,179, dated Sep. 28, 2017, 6 pages.
Restriction Requirement received for U.S. Appl. No. 15/228,942, dated Mar. 21, 2018, 6 pages.
Restriction Requirement received for U.S. Appl. No. 15/691,283, dated Mar. 5, 2019, 6 pages.
Written Opinion received for PCT Patent Application No. PCT/US2010/022868, dated Mar. 10, 2010, 4 pages.
Final Office Action received for U.S. Appl. No. 12/038,760, dated Jul. 23, 2013, 20 pages.
Final Office Action received for U.S. Appl. No. 12/038,760, dated Jun. 8, 2011, 21 pages.
Final Office Action received for U.S. Appl. No. 12/110,024, dated Dec. 24, 2012, 21 pages.
Final Office Action received for U.S. Appl. No. 12/110,024, dated Jan. 19, 2012, 12 pages.
Final Office Action received for U.S. Appl. No. 12/110,075, dated Aug. 31, 2012, 15 pages.
Final Office Action received for U.S. Appl. No. 12/333,250, dated Dec. 15, 2011, 13 pages.
Final Office Action received for U.S. Appl. No. 14/157,737, dated Aug. 31, 2015, 28 pages.
International Search Report received for PCT Patent Application No. PCT/US2008/078836, dated Mar. 19, 2009, 4 pages.
International Search Report received for PCT Patent Application No. PCT/US2009/041460, dated Jul. 17, 2009, 3 pages.
International Search Report received for PCT Patent Application No. PCT/US2009/041465, dated Aug. 5, 2009, 4 pages.
International Search Report received for PCT Patent Application No. PCT/US2016/048694, dated Oct. 31, 2016, 6 pages.
Non-Final Office Action received for U.S. Appl. No. 12/038,760, dated Jan. 2, 2013, 20 pages.
Non-Final Office Action received for U.S. Appl. No. 12/110,024, dated Jul. 3, 2012, 20 pages.
Non-Final Office Action received for U.S. Appl. No. 12/110,024, dated Jul. 11, 2011, 13 pages.
Non-Final Office Action received for U.S. Appl. No. 12/110,075, dated Jan. 25, 2012, 22 pages.
Non-Final Office Action received for U.S. Appl. No. 12/110,075, dated Jul. 8, 2011, 15 pages.
Non-Final Office Action received for U.S. Appl. No. 12/110,075, dated Mar. 28, 2013, 14 pages.
Non-Final Office Action received for U.S. Appl. No. 12/333,250, dated Aug. 17, 2011, 13 pages.
Non-Final Office Action received for U.S. Appl. No. 14/157,737, dated Feb. 10, 2015, 24 pages.
Non-Final Office Action received for U.S. Appl. No. 15/090,555, dated Nov. 3, 2017, 28 pages.
Notice of Allowance received for U.S. Appl. No. 12/038,760, dated Nov. 8, 2013, 15 pages.
Notice of Allowance received for U.S. Appl. No. 12/110,024, dated May 23, 2013, 5 pages.
Notice of Allowance received for U.S. Appl. No. 12/110,075, dated Aug. 19, 2013, 8 pages.
Notice of Allowance received for U.S. Appl. No. 12/333,250, dated Aug. 28, 2012, 10 pages.
Notice of Allowance received for U.S. Appl. No. 14/157,737, dated Dec. 14, 2015, 5 pages.
Notice of Allowance received for U.S. Appl. No. 14/329,719, dated Nov. 2, 2015, 9 pages.
Office Action received for Chinese Patent Application No. 201310330348.2, dated Nov. 3, 2015, 7 pages.
Search Report received for European Patent Application No. 08017396.6, dated Mar. 19, 2009, 7 pages.
Search Report received for Great Britain Patent Application No. GB0817242.1, dated Jan. 19, 2009, 2 pages.
Search Report received for Great Britain Patent Application No. GB0817242.1, dated Jan. 19, 2010, 2 pages.

* cited by examiner

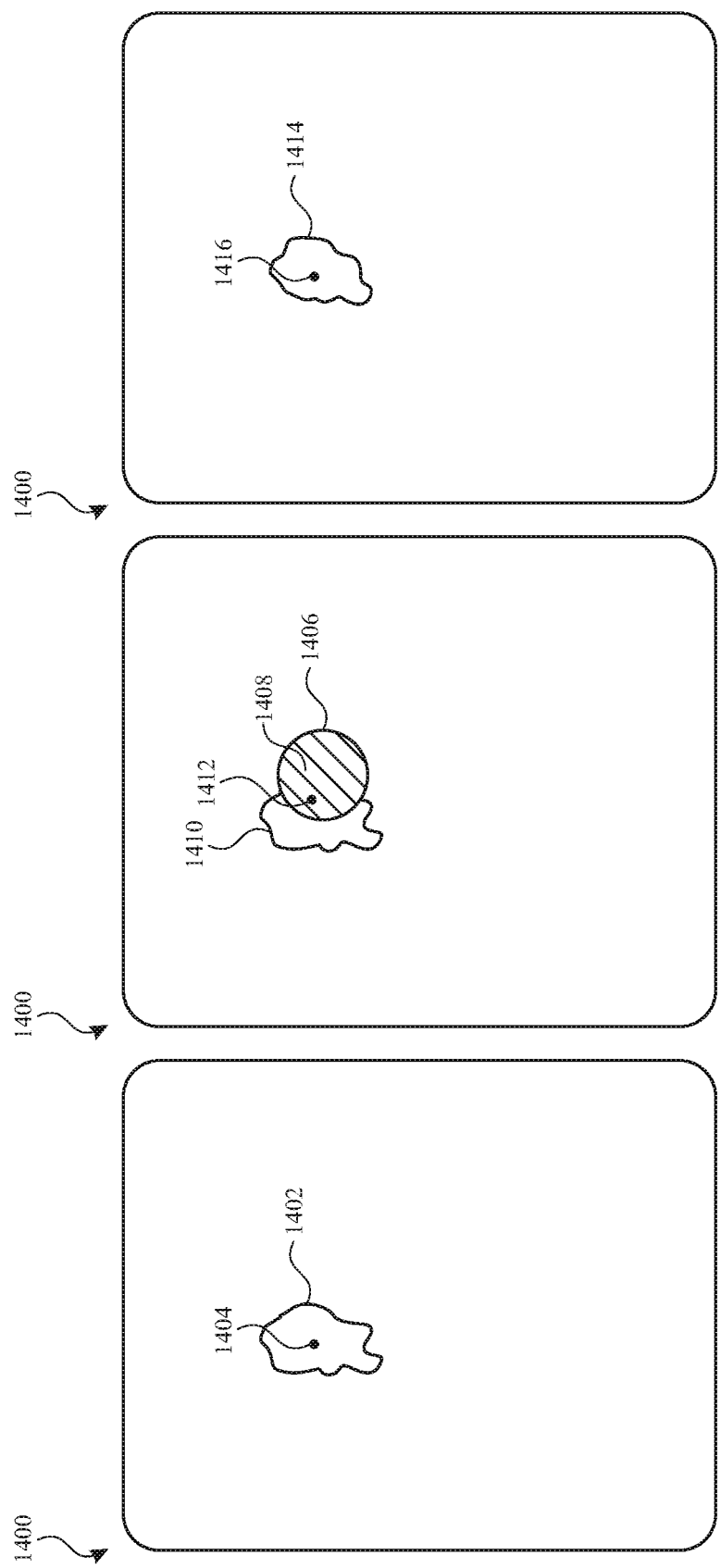

FINGER TRACKING IN WET ENVIRONMENT

CROSS-REFERENCE TO RELATED APPLICATIONS

This application claims benefit of U.S. Provisional Patent Application No. 62/488,014, filed Apr. 20, 2017, which is hereby incorporated by reference in its entirety.

FIELD OF THE DISCLOSURE

This relates generally to touch input processing for touch-sensitive devices, and more particularly, to filtering unintended contact detected on a touch sensor panel or touch screen.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the touch sensor panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch. Thereafter, the computing system can perform one or more actions based on the touch. In the case of some touch sensing systems, a physical touch on the display may not be needed to detect a touch. For example, in some capacitive-type touch sensing systems, fringing electrical fields used to detect touch can extend beyond the surface of the display, and objects approaching near the surface may be detected near the surface without actually touching the surface.

Touch sensor panels can include an array of touch sensors capable of detecting touches (the touching by an object such as a finger upon a touch-sensitive surface). Some touch sensor panels are able to detect multiple touches (e.g., the touching of multiple fingers upon a touch-sensitive surface at distinct locations at or about the same time) and near touches (e.g., fingers within the near-field detection capabilities of their touch sensors), and identify and track their locations.

In reality, however, not all touches detected on a touch sensor panel are intended user input. For example, water on the surface of the touch sensor panel can be detected as a touch. In particular, water on a touch-sensitive surface in contact with a metal housing of the device or a finger can be grounded and appear as a touch by a finger. As a result, water (or other unintentional touches) can result in unintended behavior by the device. This can negatively affect user experience, particularly in wet environments.

SUMMARY OF THE DISCLOSURE

This relates to touch input processing for touch-sensitive devices, and more particularly, to filtering unintended contact detected on a touch-sensitive surface. In wet environments in particular, water (e.g., from rain, shower, sweat, etc.) on the touch-sensitive surface can be erroneously detected as touch input and degrade touch performance. In some examples, input patches can be classified as touch patches or non-touch patches prior to computationally-intensive touch processing. Filtering out unintended touches classified as non-touch patches can reduce processing requirements and save power. Additionally, classifying input patches can improve touch performance in wet environments. In some examples, input patches can be classified as touch patches or non-touch patches based on characteristics of edge touch nodes. In some examples, input patches can be classified as touch patches or non-touch patches based on a state-based signal threshold.

BRIEF DESCRIPTION OF THE DRAWINGS

FIGS. 14A-C illustrate exemplary representations of input patches corresponding to floating water and one or more fingers on a touch-sensitive surface according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to touch input processing for touch-sensitive devices, and more particularly, to filtering unintended contact detected on a touch-sensitive surface. In wet environments in particular, water (e.g., from rain, shower, sweat, etc.) on the touch-sensitive surface can be erroneously detected as touch input and degrade touch performance. In some examples, input patches can be classified as touch patches or non-touch patches prior to computationally-intensive touch processing. Filtering out unintended touches classified as non-touch patches can reduce processing requirements and save power. Additionally, classifying input patches can improve touch performance in wet environments. In some examples, input patches can be classified as touch patches or non-touch patches based on characteristics of edge touch nodes. In some examples, input patches can be classified as touch patches or non-touch patches based on a state-based signal threshold.

Figure 1A:
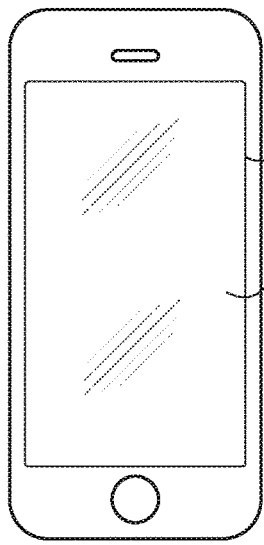
FIGS. 1A-1E illustrate exemplary systems with touch screens that can perform input processing according to examples of the disclosure.
Figure 1B:
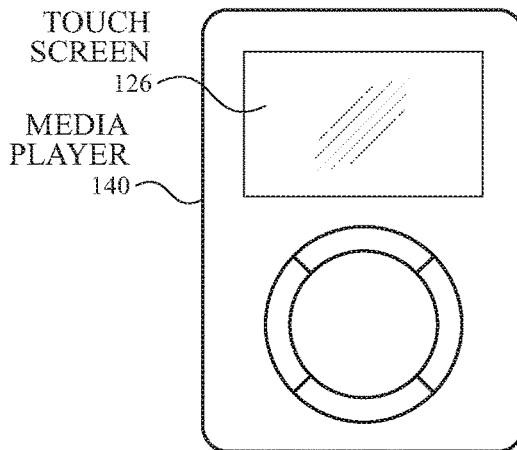
Figure 1C:
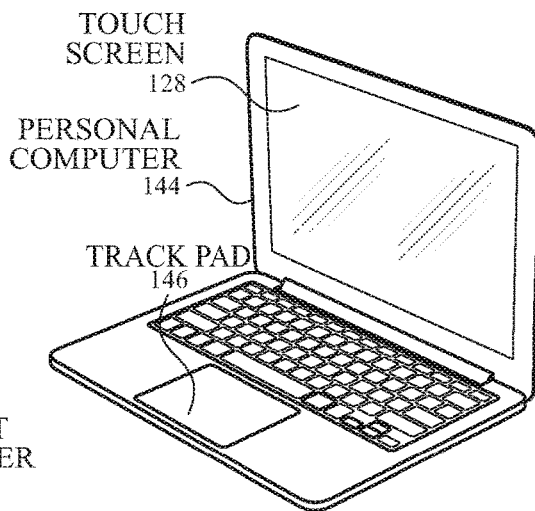
Figure 1D:
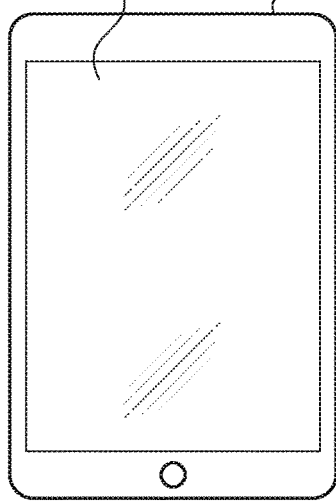
Figure 1E:
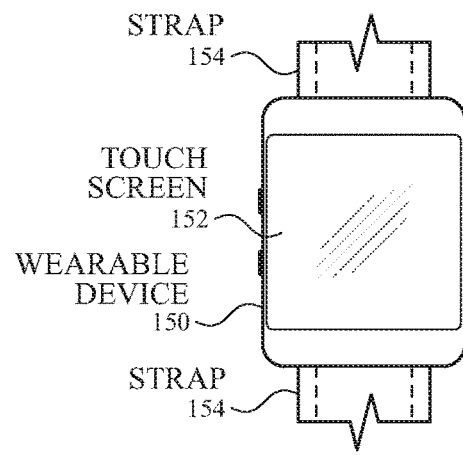

FIGS. 1A-1E illustrate exemplary systems with touch screens that can perform input processing according to examples of the disclosure. FIG. 1A illustrates an exemplary mobile telephone 136 that includes a touch screen 124 and can perform input processing according to examples of the disclosure. FIG. 1B illustrates an example digital media player 140 that includes a touch screen 126 and can perform input processing according to examples of the disclosure. FIG. 1C illustrates an example personal computer 144 that includes a touch screen 128 and a track pad 146 and can perform input processing according to examples of the disclosure (on inputs detected from the touchscreen 128 or track pad 146). FIG. 1D illustrates an example tablet computing device 148 that includes a touch screen 130 and can perform input processing according to examples of the disclosure. FIG. 1E illustrates an example wearable device 150 (e.g., a watch) that includes a touch screen 152 and can perform input processing according to examples of the disclosure. Wearable device 150 can be coupled to a user via strap 154 or any other suitable fastener. It should be understood that the example devices illustrated in FIGS. 1A-1E are provided by way of example, and other types of devices can perform input processing according to examples of the disclosure. Additionally, although the devices illustrated in FIGS. 1A-1E include touch screens, in some examples, input processing according to examples of the disclosure can be performed for touch sensor panels without a display (e.g., track pad 146). In some examples, touch screens 124, 126, 128, 130 and 152 can be based on self-capacitance or mutual capacitance. In some examples, a touch screen can be multi-touch, single touch, projection scan, full-imaging multi-touch, capacitive touch, etc.

Figure 2:
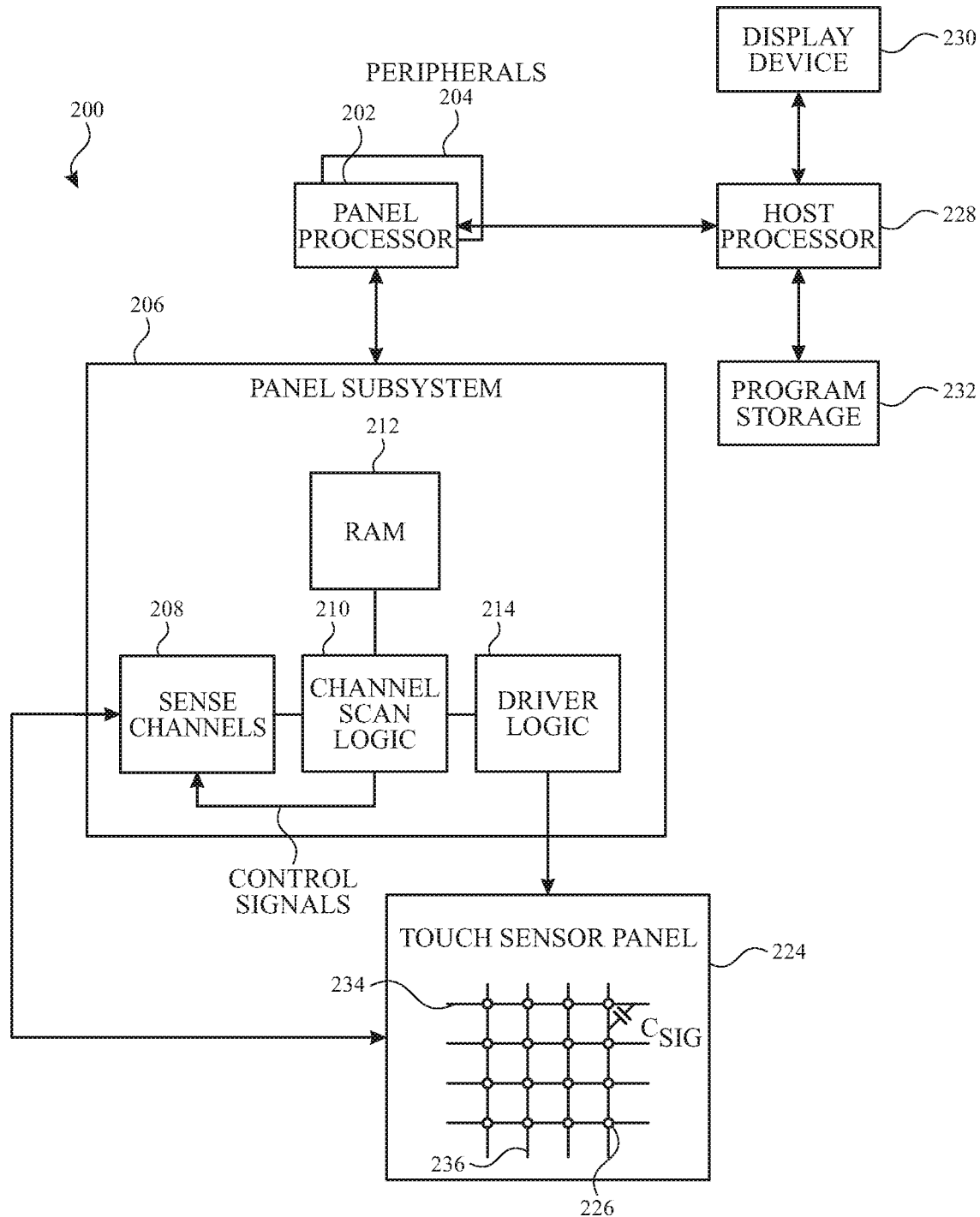
FIG. 2 illustrates an exemplary computing system including a capacitive touch sensor panel that can perform input processing according to examples of the disclosure.

FIG. 2 illustrates an exemplary computing system 200 including a capacitive touch sensor panel 224 that can perform input processing according to examples of the disclosure. Computing system 200 can be included in, for example, mobile telephone 136, digital media player 140, personal computer 144, tablet computing device 148, wearable device 150, or any mobile or non-mobile computing device that includes a touch sensor panel or touch screen. Computing system 200 can include a touch sensing system including one or more panel processors 202, peripherals 204, and panel subsystem 206. Peripherals 204 can include, but are not limited to, random access memory (RAM) or other types of memory or storage, watchdog timers and the like. Panel subsystem 206 can include, but is not limited to, one or more sense channels 208, channel scan logic (analog or digital) 210 and driver logic (analog or digital) 214. Touch sensor panel 224 can include row electrodes 234 and column electrodes 236. In mutual capacitance touch sensor panel examples, stimulation signals from driver logic 214 can be driven onto row electrodes 234, and sense signals on column electrodes 236 can be sensed by sense channels 208 (also referred to as sense circuitry). Touch or proximity events can alter the capacitive coupling Csig between row electrodes 234 and column electrodes 236 at touch nodes 226 and cause a change to the sense signals on column electrodes 236. However, in self-capacitance touch sensor panel examples, driver logic 214 and sense channels 208 can be combined, and the touch sensor panel can be driven and sensed on both row electrodes 234 and column electrodes 236. Channel scan logic 210 can access RAM 212, autonomously read data from sense channels 208 and provide control for the sense channels. In addition, channel scan logic 210 can control driver logic 214 to generate stimulation signals that can be sequentially or simultaneously applied to the row electrodes 234 of touch sensor panel 224. Panel processor 202 can process the data received from scanning the touch sensor panel. In some examples, panel subsystem 206, panel processor 202 and peripherals 204 can be integrated into a single application specific integrated circuit (ASIC) that can be referred to herein as a touch controller.

In mutual capacitance sensing examples, touch sensor panel 224 can include a capacitive sensing medium having one or more drive electrodes and one or more sense electrodes. The drive and sense electrodes can be formed from a transparent conductive medium such as Indium Tin Oxide (ITO) or Antimony Tin Oxide (ATO), although other transparent and non-transparent materials such as copper can also be used. The drive and sense electrodes can be formed on a single side of a transparent substrate. Each adjacency of drive and sense electrodes can represent a capacitive sensing node and can be viewed as touch picture element (touch pixel) or touch node 226, which can be particularly useful when touch sensor panel 224 is viewed as capturing an "image" of touch or proximity. (In other words, after panel subsystem 206 has determined whether a touch or proximity event has been detected at each sense electrode in the touch sensor panel, the pattern of sense electrodes in the touch sensor panel at which a touch or proximity event occurred can be viewed as an "image" of touch or proximity (e.g., a pattern of fingers touching the panel or proximate to, but not touching, the panel).) The capacitance between the drive and sense electrodes and local system ground can appear as a stray capacitance Cstray, and the capacitance at the intersections of the drive and sense electrodes, i.e., the touch nodes, can appear as a mutual signal capacitance Csig between the drive and sense electrodes when the given drive electrode is stimulated with an alternating current (AC) signal. The presence of a finger or other object (such as a stylus) near or on the touch sensor panel can be detected by measuring changes to a signal charge present at the nodes being touched, which can be a function of Csig. Each sense electrode of touch sensor panel 224 can be coupled to a sense channel 208 in panel subsystem 206. Touch sensor panel 224 can cover a portion or all of a surface of a device.

In some self-capacitance sensing examples, the touch sensor panel 224 can include a matrix of small plates of conductive material that can be referred to as a touch pixel, touch node, or a touch pixel electrode. The touch nodes can be formed from a transparent conductive medium such as ITO or ATO, although other transparent and non-transparent materials such as copper can also be used. The touch nodes can be formed on a single side of a transparent substrate. In some examples, a touch screen can include a plurality of individual touch nodes, each touch node identifying or representing a unique location on the touch screen at which touch or proximity (i.e., a touch or proximity event) is to be sensed, and each touch node being electrically isolated from the other touch nodes in the touch screen/panel. Such a touch screen can be referred to as a pixelated touch screen. During self-capacitance operation of the pixelated touch screen, a touch node can be stimulated with an AC waveform, and the self-capacitance to ground of the touch node can be measured. As an object approaches the touch node, the self-capacitance to ground of the touch node can change. This change in the self-capacitance of the touch node can be detected and measured by the touch sensing system to determine the positions of multiple objects when they touch, or come in proximity to, the touch sensor panel. Each touch node of touch sensor panel 224 can be coupled to a sense channel 208 in panel subsystem 206. Touch sensor panel 224 can cover a portion or all of a surface of a device. In some examples, the electrodes can be formed from rows and columns of conductive material, and changes in the self-capacitance to ground of the rows and columns can be detected.

Computing system 200 can also include host processor 228 for receiving outputs from panel processor 202 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to panel processing, and can be coupled to program storage 232 and display device 230 such as an LCD display for providing a UI to a user of the device. Display device 230 together with touch sensor panel 224, when partially or entirely overlapping with the touch sensor panel, can form a touch screen.

In some examples, touch sensor panel 224 and display device 230 together can form an integrated touch screen in which touch nodes of the touch sensing system can be integrated into the display pixel stack-ups of display device 230. The circuit elements in an integrated touch screen can include, for example, elements that can exist in LCD or other displays, such as one or more display pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor. In some configurations, each common electrode in an integrated touch screen can serve as a multi-function circuit element that can operate as display circuitry of the display system of the touch screen and can also operate as touch nodes of the touch sensing system. Specifically, each common electrode can operate as a common electrode of the display circuitry of the touch screen (e.g., during a display phase), and can also operate as a common electrode (i.e., a touch node) of the touch sensing system of the touch screen (e.g., during a touch sensing phase). It should be understood that a display phase and a touch sensing phase of an integrated touch screen may be operated at the same time, e.g., partially or completely overlapping, or the display phase and touch sensing phase may operate at different times.

In general, each of the touch nodes may be either a multi-function circuit element that can form part of the touch sensing system and can perform one or more other functions, such as forming part of the display circuitry, or may be a single-function circuit element that can operate as a touch node only. Similarly, each of the display circuit elements may be either a multi-function circuit element that can operate as display circuitry and perform one or more other functions, such as operating as a touch node, or may be a single-function circuit element that can operate as display circuitry only. Therefore, in some examples, some of the circuit elements in the display pixel stack-ups can be multi-function circuit elements and other circuit elements may be single-function circuit elements. In other examples, all of the circuit elements of the display pixel stack-ups may be single-function circuit elements.

Note that one or more of the functions described herein, including the processing of inputs according to examples of the disclosure, can be performed by firmware stored in memory (e.g., one of the peripherals 204 in FIG. 2) and executed by panel processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 3:
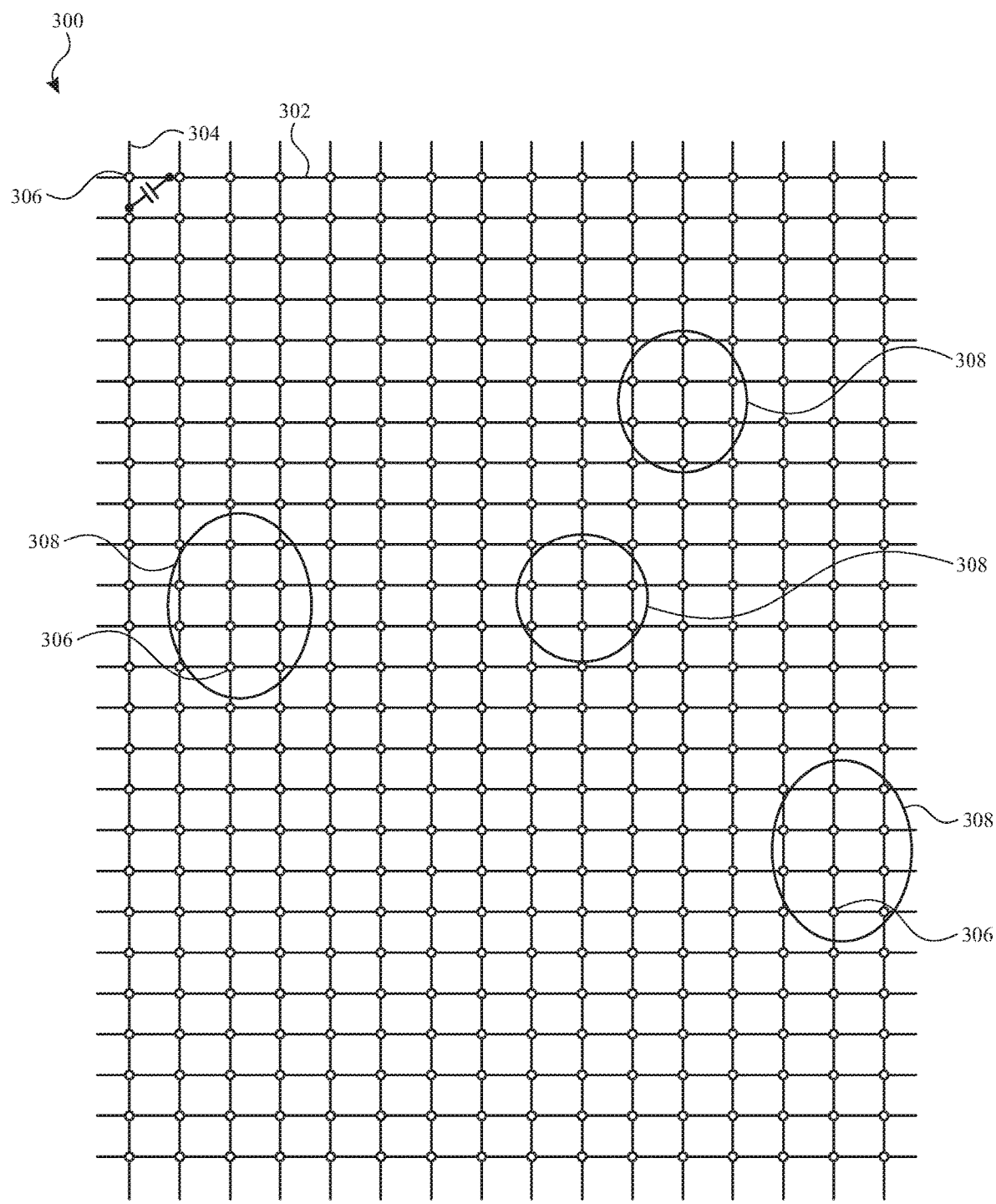
FIG. 3 illustrates an exemplary representation of an image of touch according to examples of the disclosure.

As discussed above, capacitive measurements (touch signals or data) at the touch nodes of touch sensor panel 224 can be viewed as an image of the touch (or touch image) when processed by panel processor 202 and/or host processor 228. FIG. 3 illustrates an exemplary representation of an image of touch according to examples of the disclosure. Touch screen 300 can include drive lines 302 and sense lines 304 arranged as a pattern of rows and columns, although other patterns can be possible. Touch nodes 306 can be formed at the intersection between drive lines 302 and sense lines 304, and the mutual capacitance (or change in mutual capacitance) therebetween can be measured. Each object touching or proximate to, but not touching, the touch screen 300 can produce a touch signal at proximate touch nodes 306. By processing the touch image, touch signals from proximate touch nodes 306 (e.g., those touch signals meeting a threshold signal level) can be grouped together to form input patches 308. Thus, the input patches 308 can be regions within the image of touch corresponding to touch nodes 306 having signal values produced by an object touching (or proximate to, but not touching, in some examples) the touch screen 300. The input patches identified in a touch image can be tracked through multiple successive touch images. Input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch-sensitive surface through a liftoff from the touch-sensitive surface. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path.

Various characteristics can be computed for each input patch in the touch image that can be used for further processing. For example, each input patch can be characterized by total signal, peak signal, position, shape, size and/or orientation. In some examples, each input patch can be represented by an ellipse defined by a centroid (location of touch), major and minor axis lengths and/or a major axis orientation. In some examples, the number of touch nodes, peak signal, total signal and/or signal density for each input patch can be computed. In some examples, the number of touch nodes, peak signal and/or peak signal density can be tracked for each path across multiple touch images.

For example, the number of touch nodes in a path can be calculated by counting the number of touch nodes with the threshold signal level included in the input patch. The peak signal can, for example, be calculated by taking the maximum signal measured at the touch nodes included in the input patch. An input patch's total signal can, for example, be calculated by summing the square of the signal value at each touch node in the input patch. Thus, total signal for an input patch can be expressed mathematically as in Equation (1):

$$Z_P = \sum_{i,j \text{ in } p} [V_{[i][j]}^2] \qquad (1)$$

where $Z_P$ can represent the total signal for an input patch, V can represent the signal value at a touch node and i, j can represent the row and column coordinate of each touch node. In some examples, the signal value at each touch node can be calibrated (e.g., normalized) before computing the total signal.

An input patch's signal density can be computed based on the input patch's total signal. In some examples, an input patch's signal density can be calculated by dividing the total signal for an input patch by the geometric mean radius of the input patch. In other examples, the input patch's signal density can be calculated by dividing the total signal for an input patch by the number of touch nodes in the input patch. Thus, signal density for an input patch can be expressed mathematically, for example, as in Equations (2) or (3):

$$Z_{density,p} = \frac{Z_p}{\text{geometric mean radius of } P} \qquad (2)$$

$$Z_{density,p} = \frac{Z_p}{\text{number of touch nodes forming } P} \qquad (3)$$

A conventional touch sensing systems may process and compute characteristics for all input patches identified in an acquired image. In other words, these conventional touch sensing systems may process patches corresponding to intentional, actual touches as well as input patches corresponding to unintended touches or liquids (e.g., water). In some examples, further processing can be used to identify and reject touches from water or unintended touches. However, processing all input patches this way can be viewed as a brute force approach to handling input patches. In some examples of the disclosure, input patches can be classified based on information gathered by initial processing of the input patches with relatively low-intensity processing before performing the relatively computation-intensive processing applied to likely touches. Classifying input patches can improve efficiency by excluding input patches that are likely not intended touch input before applying computation-intensive touch processing algorithms. As described herein, in some examples, the initial input patch processing can include segmentation of the touch image to identify input patches exceeding a signal threshold (e.g., a first signal threshold), a determination of peak signal for each respective patch, and a determination of a number of touch nodes for each respective patch. In some examples, the initial input patch processing can include computing a signal density and/or an occupancy for respective input patches. In some examples, the input patch processing can include low-intensity image processing, such as image filtering and/or computing a difference image. In subsequent processing, input patches identified as touches can be fully parametrized and processed to generate touch input for a computing system. Excluding input patches based on the initial processing without the subsequent further processing can reduce processing requirements of, and thereby reduce power consumption by, the touch sensing system. Additionally, eliminating likely non-touch input patches before processing can avoid false positives when the further processing algorithms fail to differentiate between intended and non-intended touches.

As described in more detail below with respect to FIGS. 5-9, some input patches can be excluded from further processing based on characteristics of signals measured at edge touch nodes. As described in more detail below with respect to FIGS. 10-16F, some input patches can be excluded from further processing based on a state-determined characteristic of signals measured at touch nodes. For example, a signal threshold can be increased from a first signal threshold to a second signal threshold to classify the input patch as a touch patch or non-touch patch.

Figure 4:
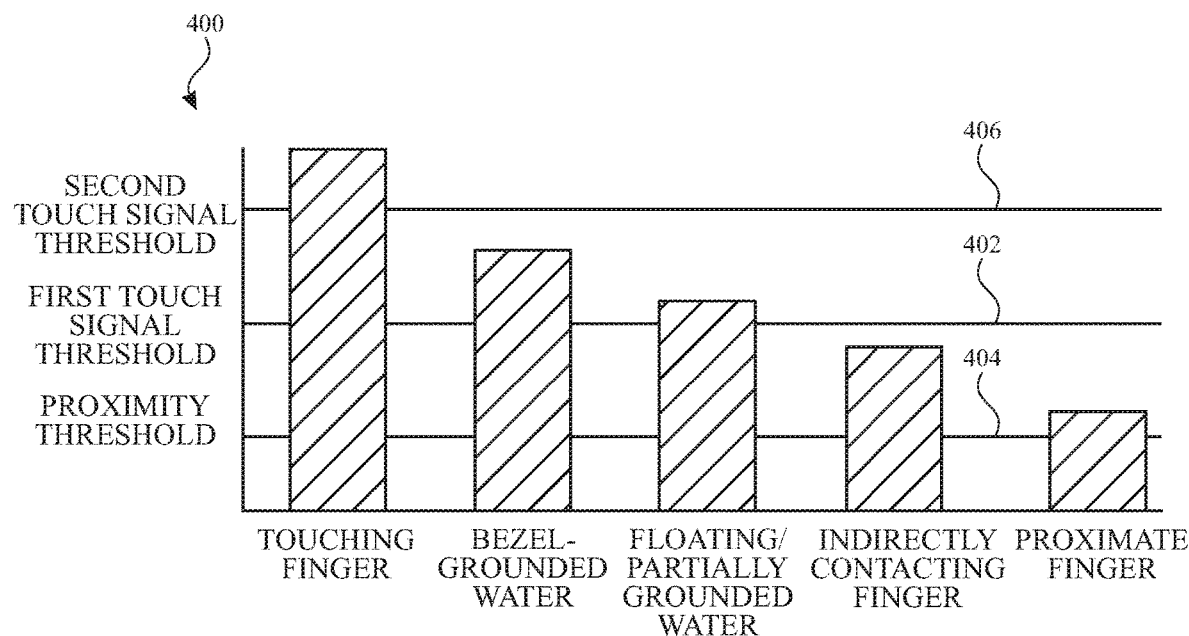
FIG. 4 illustrates an exemplary plot of touch signal thresholds corresponding to different objects proximate to or touching a touch-sensitive surface according to examples of the disclosure.

FIG. 4 illustrates an exemplary plot 400 of touch signal thresholds corresponding to different objects proximate to or touching a touch-sensitive surface according to examples of the disclosure. FIG. 4 illustrates example peak signals for an input patch corresponding to a finger proximate to, but not in contact with, a touch-sensitive surface, a finger indirectly contacting the touch-sensitive surface (e.g., via a glove or bandage), a finger in contact with a touch-sensitive surface, a floating or partially grounded water drop (or other liquid), and a bezel-grounded water drop (or other liquid). It should be understood that these are representative peak signal measurements for input patches, and that a range of peak signal values are possible for these objects. For example, an indirectly contacting finger may have a peak signal larger than a floating water drop when the separation between the indirectly contacting finger and the touch-sensitive is within a threshold distance of the screen (e.g., <1 mm). Among the represented objects in FIG. 4, peak signal for an input patch can be greatest for a finger in contact with a touch-sensitive surface and least for a fingering proximate to, but not in contact with, the touch sensitive surface. Peak signal for an input patch corresponding to a bezel-grounded water drop can be less than for an input patch corresponding to a finger in contact with the touch-sensitive surface, but greater than for an input patch corresponding to a floating or partially grounded water drop. Peak signal for an input patch corresponding to a floating or partially-grounded water drop can be less than for an input patch corresponding to a bezel-grounded water drop, but greater than for an input patch corresponding to an indirectly contacting finger or a proximate, non-contacting finger.

In some touch sensing systems, a first touch signal threshold 402 can be defined to differentiate between input patches corresponding to touches and non-touches. In some examples, this first touch signal threshold can be used to identify input patches in a touch image. For example, the peak signal corresponding to a finger in contact with a touch sensitive surface can meet the first touch signal threshold 402, but the peak signal corresponding to a proximate, non-contacting finger can fail to meet the first touch signal threshold 402. The peak signal corresponding to a water drop (grounded or floating), however, can also meet the first touch signal threshold. Raising the threshold from the first touch signal threshold 402 to a second touch signal threshold 406 can better reject input patches corresponding to water, but can cause the touch sensing system to miss actual finger touches (increasing false negatives). In some examples, as described in more detail below, in a first mode of operation (e.g., corresponding to a dry environment) the first touch signal threshold 402 can be used to classify input patches, and in a second mode of operation (e.g., corresponding to a wet environment) a second touch signal threshold 406, higher than the first touch signal threshold, can be used. Using the second touch signal threshold 406 can result in rejecting input patches corresponding to water (grounded and/or floating).

In some touch sensing systems, a proximity threshold 404 can be defined to identify input patches corresponding to objects proximate to, but not in contact with, the touch sensitive surface. In some examples, these proximate, non-contacting patches can be used to wake up the device or otherwise prepare for touch input. Additionally, in some touch sensing systems, indirectly contacting fingers or objects can be detected using a dynamically adjustable touch signal threshold 402 or using other conditions as described in U.S. Pat. No. 9,690,417 to Ari Y. BENBASAT, the disclosure of which is herein incorporated by reference in its entirety for all intended purposes.

Figure 5:
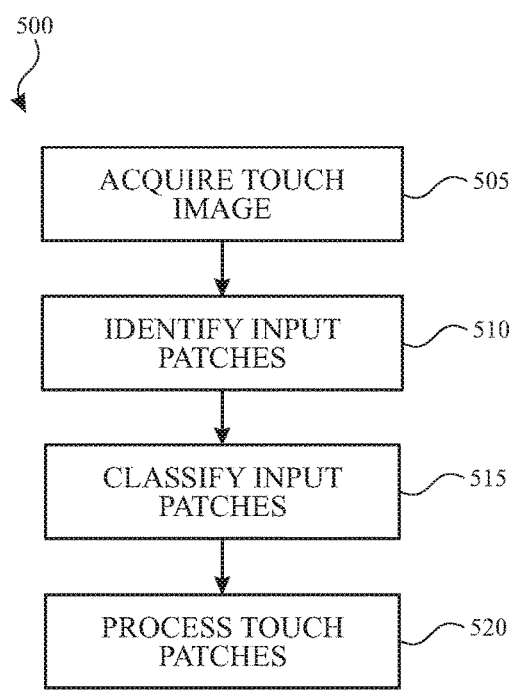
FIG. 5 illustrates an exemplary process for processing input to a touch-sensitive surface according to examples of the disclosure.

FIG. 5 illustrates an exemplary process 500 for processing input to a touch-sensitive surface according to examples of the disclosure. At 505, a touch image can be acquired. For example, signals can be measured by performing a mutual capacitance or self-capacitance scan of touch nodes of the touch screen or touch sensor panel of exemplary systems illustrated in FIGS. 1A-1E. The touch image can be formed from the signals measured during the scan. In some examples, the signals can be arranged in a two-dimensional image such that the x-coordinate and y-coordinate of the touch image corresponds to the x-coordinate and y-coordinate of the touch node. At 510, input patches can be identified. In some examples, the input patches can be identified using an image segmentation processes. The image segmentation process can include image filtering (e.g., subtracting a baseline from the touch image and/or spatial-smoothing using a two-dimensional diffusion operator or Gaussian kernel) and segmenting the filtered touch image into input patches (groups touch nodes) corresponding to the distinguishable objects (e.g., fingers or other hand parts, styli, etc.). The touch nodes in the input patches can include a local maximum signal and proximate signals which meet a signal threshold (e.g., one of the signal threshold illustrated in FIG. 4). Some parameters of the input patches can be determined for identified input patches. In some examples, the parameters can include signal measurements for the touch nodes of the input patches, the number of touch nodes of the input patches, and/or signal density of the input patches. At 515, input patches can be classified. The classification can classify input patches (and/or corresponding paths) as corresponding to likely intended/actual touches (also referred to herein as "valid touches" or "touch patches") or as corresponding to likely unintended touches or liquids such as water (also referred to herein as "invalid touches" or "non-touch patches"). In some examples, input patches (and/or corresponding paths) can be classified as proximity patches. At 520, input patches classified as touch patches can be further processed to determine touch input for the computing system. The further processing can include further parameterization of the input patches (and/or paths). In some examples, the further processing can include ellipse fitting and centroid determination. In some examples, the further processing can include algorithms to compensate for ungrounded and/or poorly grounded objects, to compensate for negative touch pixel effects, to reject contacts from liquids (e.g., water), and/or to detect gestures. Input patches classified as non-touch patches and/or proximity patches can be excluded from the further processing, in some examples. By forgoing this further processing, the touch sensing system can reduce processing requirements (and power consumption). Additionally, the classification of touches can improve touch performance when operating in wet environments, as described in more detail herein.

Figure 6A:
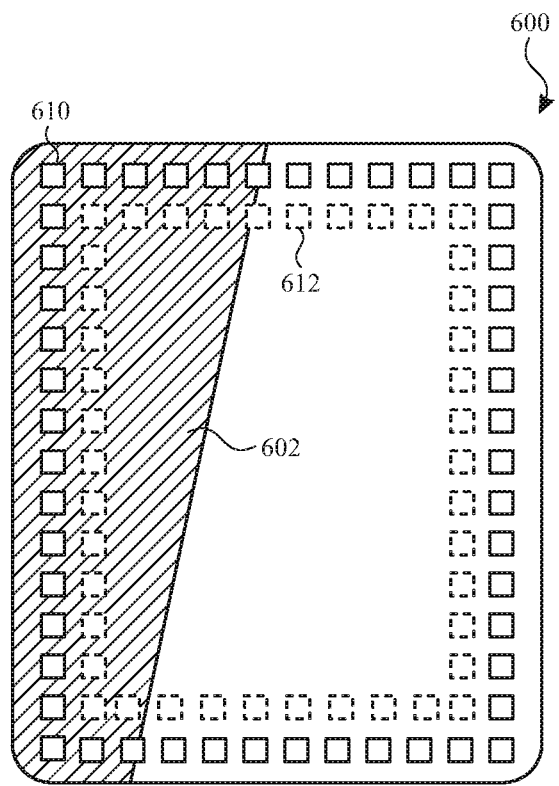
FIGS. 6A and 6B illustrate exemplary representations of input patches including edge touch nodes corresponding to one or more edges of a touch-sensitive surface according to examples of the disclosure.
Figure 6B:
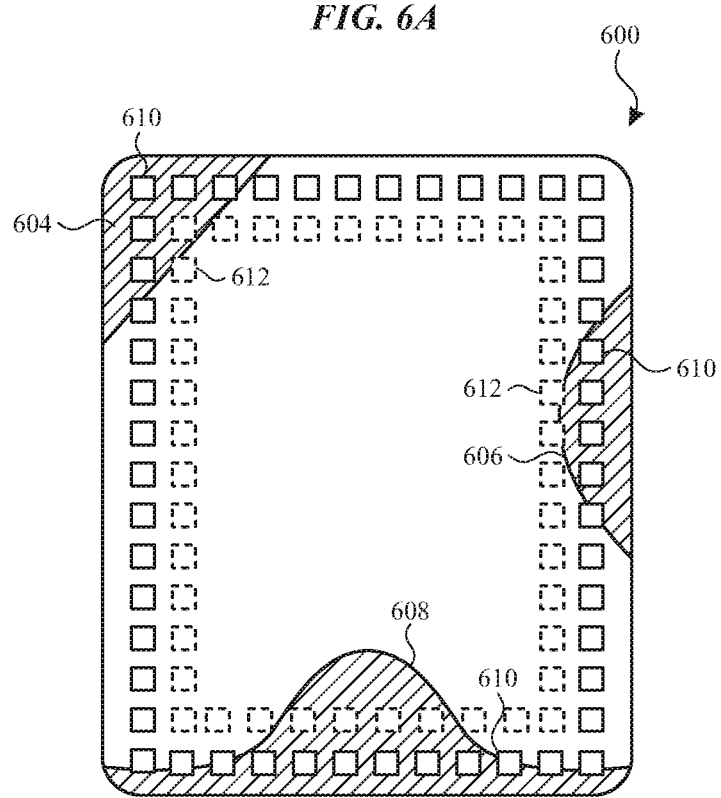

In some examples, an input patch along one or more edges of a touch-sensitive surface can be identified as a touch patch or non-touch patch based on one or more characteristics of one or more edge touch nodes corresponding to the input patch. FIGS. 6A and 6B illustrate exemplary representations of input patches including edge touch nodes corresponding to one or more edges of a touch-sensitive surface according to examples of the disclosure. An edge touch node can be defined as a touch node within a threshold distance from an edge of the touch sensitive surface. For example, as illustrated in FIGS. 6A and 6B, touch-sensitive surface 600 can include an array of touch nodes. In some examples, the threshold distance can be such that only touch nodes 610, which are immediately adjacent to an edge of the touch-sensitive surface 600, can be included as edge touch nodes. In some examples, the threshold distance can be such that touch nodes 612, which are not immediately adjacent with the edge of the touch-sensitive surface 600, can be included as touch nodes as well.

FIG. 6A illustrates an input patch 602 on touch-sensitive surface 600. Input patch 602 can correspond, for example, to an object covering a portion of a touch screen and touching multiple sides of the touch screen. For example, input patch 602 and touch-sensitive surface 600 can correspond to a touch screen 152 of wearable device 150 partially submerged in a liquid (e.g., water). The liquid can be grounded (at least partially) by contacting a conductive bezel of the touch-sensitive device. As a result of bezel-grounding, input patch 602 may be detected and identified as a touch by a conventional touch-sensing system. As another example, input patch 602 and touch-sensitive surface 600 can correspond to an arm resting on touch screen 130 of tablet computing device 148). Input patch 602 can be an undesired touch (e.g., because such an input patch can be atypical for a touch-sensitive surface), but may be detected and identified as a touch by a conventional touch-sensing system.

In some examples, further processing of the input patches can cause these input patches corresponding to water or unintended touch to be ignored rather than provide touch input that can be used by the user interface. However, as described herein, classifying input patches and then forgoing processing of input patches classified as non-touch patches can reduce processing (and power) requirements for the touch sensing system. As described in more detail below, in some examples, input patch 602 can be identified as a non-touch patch based on characteristics of one or more edge touch nodes 610 (and 612) corresponding to input patch 602. For example, a touch sensing system can determine from an acquired touch image a number of "strong" edges of a respective input patch. The number of strong edges of an input patch can be used to classify input patches as touch patches or non-touch patches.

FIG. 6B illustrates touch-sensitive surface 600 with input patches 604, 606 and 608. Input patch 604 can correspond, for example, to an object covering a corner of a touch screen and touching two sides of the touch screen 600. Input patch 606 can correspond, for example, to an object touching along one side of the touch screen 600. Input patch 608 can correspond, for example, to an object touching along multiple sides of touch screen 600, but primarily touching along one side of touch screen 600. Input patches 604, 606 and 608 can correspond to cases in which the input patch may correspond to a touch patch or may correspond to a non-touch patch. For example, input patches 604, 606 and 608 can correspond to grounded water on the touch-sensitive surface 600 or to a touch object (e.g., a finger) contacting the touch-sensitive surface. In some examples, further processing of the input patches can cause these input patches corresponding to water or unintended touch to be ignored rather than provide touch input that can be used by the user interface. However, as described herein, classifying input patches and then forgoing processing of input patches classified as non-touch patches can reduce processing (and power) requirements for the touch sensing system. As described in more detail below, in some examples, input patches 604, 606 and 608 can be classified as a touch patch or non-touch patch based on characteristics of one or more edge touch nodes 610 (and 612) corresponding to the respective input patches. For example, a touch sensing system can determine from an acquired touch image a number of "strong" edges of a respective input patch. The number of strong edges of a respective input patch can be used to classify the respective input patch as a touch patch or a non-touch patch.

Figure 7:
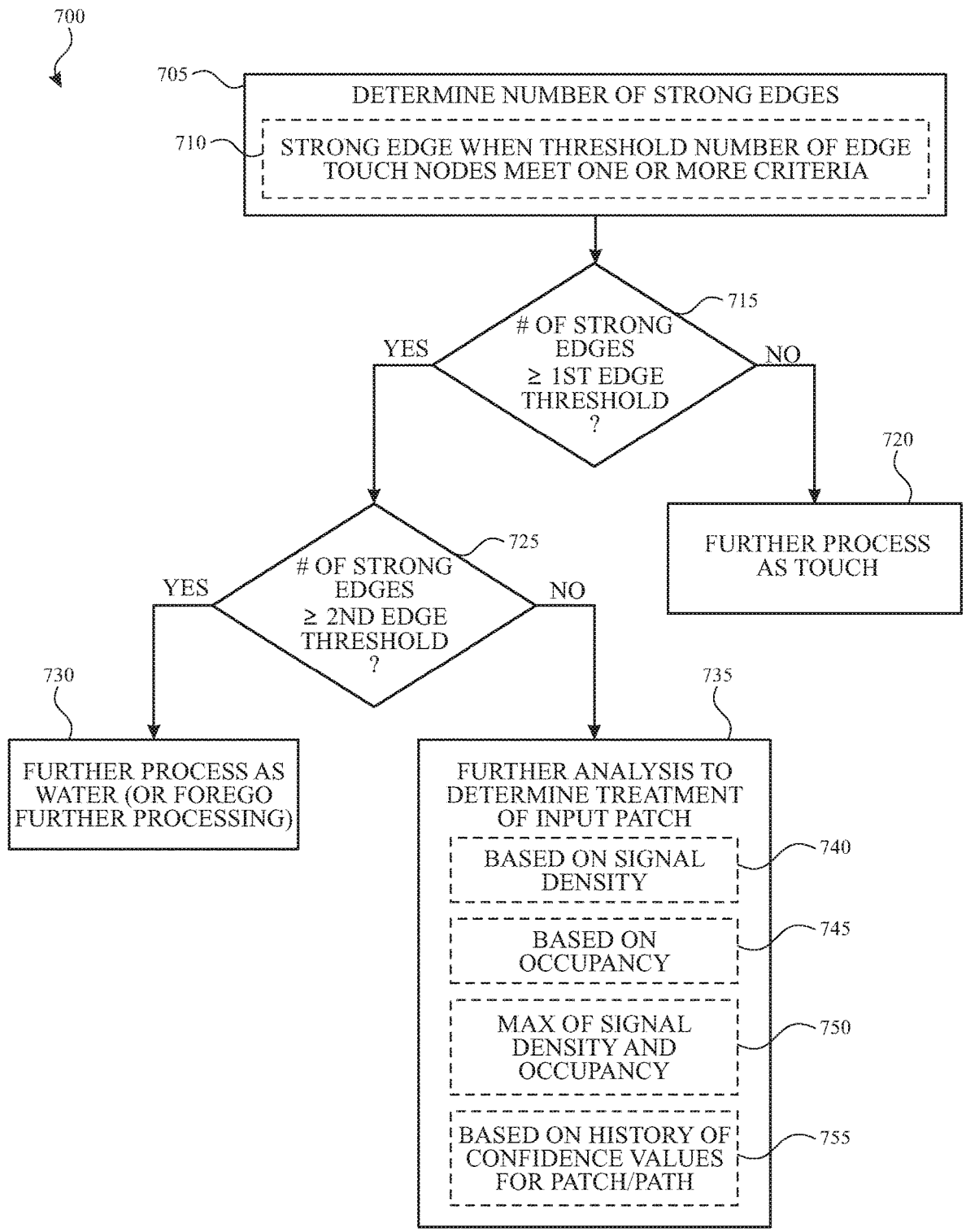
FIG. 7 illustrates an exemplary process for classifying input patches based on a number of strong edges according to examples of the disclosure.

FIG. 7 illustrates an exemplary process 700 for classifying input patches based on a number of strong edges according to examples of the disclosure. Process 700, for example, can be performed at 515 in process 500 illustrated in FIG. 5. The number of strong edges can be used to classify input patches and thereby determine whether to process and how the process the input patches. In some examples, the number of strong edges can be used to determine a confidence value that can be used for classifying an input patch. When the confidence value meets a confidence value threshold, the input patch can be classified as a non-touch patch and the touch sensing system can forgo further processing of the input patch. When the confidence value fails to meet the confidence value threshold, the input patch can be classified as a touch patch and the touch sensing system can further process the input patch for touch input. In the examples described below, the confidence value can range between zero and one, where zero corresponds to a maximum likelihood that an input patch is a touch patch, and one corresponds to a maximum likelihood that an input patch is a non-touch patch (e.g., corresponding to water). It should be understood, however, that the classification of input patches can be based on different conventions or be done without calculating a confidence value.

At 705, a number of strong edges can be determined for a respective input patch. The number of strong edges can be determined from the edge touch nodes of the acquired touch image (e.g., acquired at 505 in process 500). In some examples, a smoothing filter can be applied to the acquired touch image before determining the number of strong edges. In some examples, to avoid input patch splitting, the smoothing filter can be applied to edge touch nodes only. An edge of a respective input patch can be identified as a strong edge based on a threshold number of edge touch nodes meeting one or more criteria (710). In some examples, an edge of a respective input patch can be identified as a strong edge based on the signal measurements at touch nodes corresponding to the respective input patch and corresponding to an edge of the touch-sensitive surface (i.e., edge touch nodes). As discussed above, edge touch nodes can be defined as touch nodes within a threshold distance from an edge of the touch-sensitive surface. In some examples, the threshold distance can be defined to include touch nodes along the perimeter of the touch sensitive surface (e.g., touch nodes 610 in FIGS. 6A-6B). In some examples, the threshold distance can be defined to include additional touch nodes as edge touch nodes (e.g., touch nodes 612 in FIGS. 6A-6B). In some examples, a strong edge can be identified based on a threshold number of edge touch nodes meeting a signal threshold criterion. In some examples, the signal threshold criterion can be set based on the size of the touch sensor panel. For example, a smaller touch sensor panel can more readily encounter touches close to edges of the touch sensor panel and therefore a larger signal threshold can be used relative to signal threshold used for a larger touch sensor panel. In some examples, the threshold number of edge touch nodes can be set at one, such that any edge touch node exceeding a signal threshold can be sufficient to identify the edge as a strong edge. In some examples, the threshold number of edge touch nodes can be set at some other threshold number of edge touch nodes greater than one (e.g., 2, 5, 10, etc.). In some examples, in order to be identified as a strong edge the threshold number of edge touch nodes must be contiguous. For example, if the threshold number of edge touch nodes corresponds to four edge touch nodes, the four edge touch nodes must be contiguous (e.g., adjacent to one another). In some examples, the threshold number of edge touch nodes need not be contiguous.

At 715, the touch sensing system can compare the number of strong edges corresponding to a respective input patch to a first number-of-edges threshold. When the number of edges fails to meet the first number-of-edges threshold, the touch sensing system can identify the input patch as a touch patch and further process the touch patch accordingly (720). In examples using a confidence value, when the number of edges fails to meet the first number-of-edges threshold, the touch sensing system can set a confidence value for the respective input patch to indicate a high-likelihood that the respective input patch is a touch patch. In some examples, a confidence value of the respective input patch can be set to a minimum value (i.e., zero). In some examples, rather than setting the confidence value to a minimum value, a confidence value can be determined (as described in more detail below) and then decreased (e.g., scaled by a factor less than one, decreased by a constant value, etc.). When the number of edges meets the first number-of-edges threshold, the touch sensing system can, at 725, compare the number of strong edges corresponding to the respective input patch to a second number-of-edges threshold. The second number-of-edges threshold can be greater than the first number-of-edges threshold. When the number of edges meets the second number-of-edges threshold, the touch sensing system can identify the input patch as a non-touch patch (e.g., as water) and further process the non-touch patch accordingly or not at all (730). In examples using a confidence value, when the number of edges meets the second number-of-edges threshold, the touch sensing system can set a confidence value for the respective input patch to indicate a high-likelihood that the respective input patch is a non-touch patch. In some examples, a confidence value of the respective input patch can be set to a maximum value (i.e., one). In some examples, rather than setting the confidence value to a maximum value, a confidence value can be determined (as described in more detail below) and then increased (e.g., scaled by a factor greater than one, incremented by a constant value, etc.).

At 735, when the number of edges fails to meet the second number-of-edges threshold, the touch sensing system can perform further analysis to determine how to classify the input patch and thereby determine treatment for subsequent processing (or lack thereof). The further analysis can be based on signal density and/or occupancy of the respective input patch. In examples using a confidence value, the further analysis can include calculating a confidence value. The confidence value can be determined based on various characteristics acquired from the initial processing of the acquired touch image. For example, the confidence value can be based on signal density of the respective input patch (740) and/or the occupancy of the respective input patch (745). As described above, the signal density of the respective input patch can be calculated based on the total signal and the size of the respective input patch. The occupancy of the respective input patch can be a measure of the variability of the touch signal across touch nodes of a respective input patch. For example, an input patch whose touch nodes report uniform signal measurements can have an occupancy measure of 100%. The occupancy can decline as the variance in the signal measurements from the touch nodes of a respective input patch increases. In some examples, the confidence value can be based on the maximum of the signal density and the occupancy (750). The signal density and the occupancy can be normalized to correspond to the likelihood that an input patch is a touch patch or a non-touch patch. In some examples, the maximum of the signal density and the occupancy can provide an instantaneous confidence value for the respective input patch and corresponding touch image. In some examples, the confidence value can be based on a history of confidence values (755) and the instantaneous confidence value to avoid switching the classification between a touch patch and non-touch patch too easily. For example, the confidence value can be based on a maximum of an instantaneous confidence value for the touch image and a weighted historical confidence value. In some examples, the weighting can be a decay parameter to scale the historical confidence value. In some examples, the weighting can be reduced to minimize the impact of the historical confidence value when the number of strong edges changes (e.g., from two strong edges to one strong edge). Reducing the weighting in such a way can prevent identifying an input patch corresponding to an actual finger from being identified as water for too long after the reduction in the number of strong edges (where the historical confidence value parameter would otherwise delay recognition of the input patch as a touch patch, thereby reducing responsiveness of the touch system). In some examples, the historical confidence value can be based on one or more prior confidence values. In some examples, the historical confidence value can be based on the confidence value of the respective input patch from the last touch image. In some examples, the historical confidence value can be based on confidence values of the respective input patch from the last plurality of touch images (e.g., the arithmetic average or otherwise weighted average of the confidence values from the last integer number of touch images). In some examples, when the instantaneous confidence value exceeds a threshold, the confidence value calculation can bypass the history of confidence values and adopt the instantaneous confidence value. In some examples, when the instantaneous confidence value exceeds a threshold, the confidence value can bypass the history of confidence values and adopt the maximum of the instantaneous confidence value and the last confidence value.

As described herein, the confidence value of a respective input patch can be compared with a confidence value threshold. When the confidence value of the respective input patch meets the confidence value threshold, the touch sensing system can forgo further processing of the respective input patch. When the confidence value of the respective input patch fails to meet the confidence value threshold, the touch sensing system can further process the respective input patch to determine touch input. In some examples, the confidence value threshold can be at the midpoint of the confidence value range. In some examples, the confidence value threshold can be set higher (e.g., 60%, 75%, 90% of the confidence value range) or lower than the midpoint. Setting the confidence value threshold higher can result in fewer missed touches (false negatives), but require increased processing to reject unintentional touches or water touches. Setting the confidence value threshold lower can result in more false negatives, but reduces processing requirements for non-touches.

In some examples, the confidence value threshold can depend on the mode of operation. For example, the confidence value threshold can be adjusted to default to a higher confidence value threshold, and more liberally process input patches that may not be actual touches, to avoid missing actual touches. However, when a wet environment is encountered, the confidence value threshold can be lowered to avoid processing input patches more likely corresponding to water. In some examples, the confidence value threshold can also be lowered when a touch-sensitive device is in a state in which reducing processing requirements can be desired (e.g., low battery state).

Figure 8:
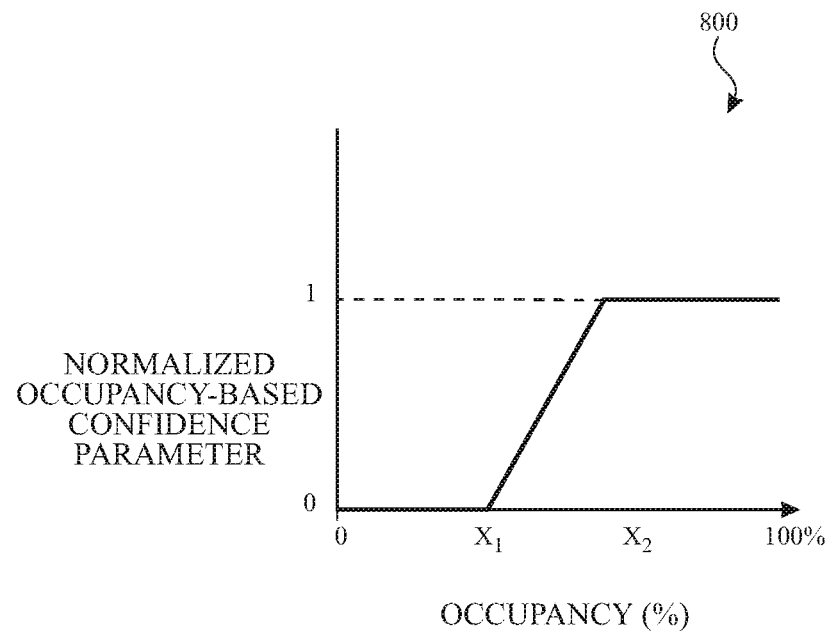
FIG. 8 illustrates an exemplary plot of a confidence value contributing parameter based on occupancy according to examples of the disclosure.
Figure 9:
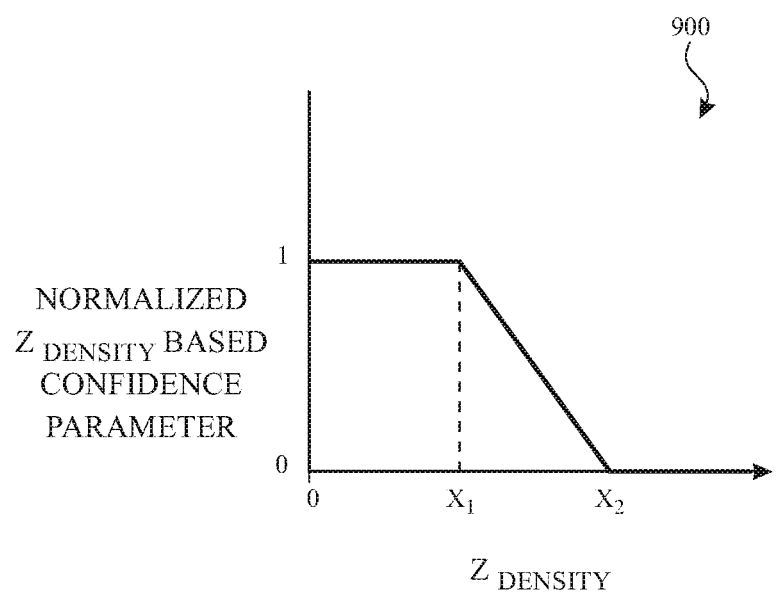
FIG. 9 illustrates an exemplary plot of a confidence value contributing parameter based on signal density according to examples of the disclosure.

FIGS. 8 and 9 illustrate exemplary plots of confidence value contributing parameters based on occupancy and signal density according to examples of the disclosure. FIG. 8 illustrates an exemplary plot 800 of a confidence value contributing parameter based on occupancy according to examples of the disclosure. Input patches corresponding to water (or other liquids) on a touch-sensitive surface can have relatively uniform signal measurements across touch nodes of an input patch. Input patches corresponding to fingers or other grounded touch objects on the touch-sensitive surface can have distributed signal measurements across touch nodes of an input patch. For example, a touch patch can have a local maximum signal and signals can decay (e.g., exponentially) for touch nodes moving away from the local maximum. As a result, for occupancies less than a first threshold ($X_1$ in plot 800), the confidence value contributing parameter based on occupancy can be zero (high likelihood of touch patch) and for occupancies above a second threshold ($X_2$ in plot 800), the confidence value contributing parameter based on occupancy can be one (high likelihood of touch non-touch patch, e.g., water). For occupancies between the first and second thresholds, the confidence value contributing parameter based on occupancy can increase as occupancy increases from $X_1$ to $X_2$. Although plot 800 illustrates a linear increase in the confidence value contributing parameter, the behavior may be non-linear in some examples. In some examples, the confidence value (e.g., instantaneous) can be set to the confidence value contributing parameter based on occupancy.

FIG. 9 illustrates an exemplary plot 900 of a confidence value contributing parameter based on signal density according to examples of the disclosure. Input patches corresponding to water (or other liquids) on a touch-sensitive surface can have relatively low signal density. Input patches corresponding to fingers or other grounded touch objects on the touch-sensitive surface can have a relatively high signal density. As a result, for signal densities less than a first threshold ($X_1$ in plot 900), the confidence value contributing parameter based on signal density can be one (high likelihood of touch non-touch patch, e.g., water) and for signal densities above a second threshold ($X_2$ in plot 900), the confidence value contributing parameter based on signal density can be zero (high likelihood of touch patch). For signal densities between the first and second thresholds, the confidence value contributing parameter based on occupancy can decrease as signal density increases from $X_1$ to $X_2$. Although plot 900 illustrates a linear decrease in the confidence value contributing parameter, the behavior may be non-linear in some examples. In some examples, the confidence value (e.g., instantaneous) can be set to the confidence value contributing parameter based on signal density.

Returning to the exemplary process of FIG. 7, in some examples, the first number-of-edges threshold can be set to two edges and the second number-of-edges threshold can be set to three edges. When the second number-of-edges threshold is met (i.e., three or more strong edges), the confidence value of an input patch can either be set to the maximum confidence value (bypassing the need for computing a confidence value) or the computed confidence value can be increased. As a result, input patches, such as input patch 602 in FIG. 6A, that can have three strong edges, can be more likely to be classified (and with relatively low processing requirements) as a non-touch patch, and thereby further processing can be avoided. When the first number-of-edges threshold is not met (i.e., one or no strong edge), the confidence value of an input patch can either be set to the minimum confidence value (bypassing the need for computing a confidence) or the computed confidence value can be decreased. As a result, input patches, such as input patch 606 in FIG. 6B, that can have one (or no) strong edge, can be more likely to be classified (and with relatively low processing requirements) as a touch patch, and further processed to determine touch input.

When the first number-of-edges threshold is met, but the second number-of-edge threshold is not met, a confidence value can be calculated to improve accuracy of the classification of the input patch as a touch patch or non-touch patch. As a result, input patches with two strong edges (e.g., input patches 604 and 608 in FIG. 6B, which may correspond to water or a finger, for example), can be evaluated based on the confidence values before classifying the input patch as a touch patch or a non-touch patch.

It should be noted that although input patches 604, 606 and 608 may correspond to water, and their classification based on strong edges may fail to identify the input patch as non-touch patches, additional classification processes (discussed in more detail below), may properly classify the input patches as corresponding to non-touch patches.

In some examples, floating or partially grounded liquids (e.g., water) can degrade touch performance. In some examples, floating or partially grounded water can interfere with the detection of a touchdown or a liftoff of an object (e.g., a finger). In some examples, floating or partially grounded water can interfere with the detection of a swipe gesture or cause a swipe gesture to be unintentionally canceled. In some examples, floating or partially ground water can merge with an object (e.g., a finger) and offset centroid detection (causing unwanted jitter in the touch sensing system performance). In some examples, small droplets of water along the edges of a touch sensor panel (which may not be detected based on the process of FIG. 7) can be detected as false taps or swipes, for example. In some examples, to improve performance in wet environments, input patches can be classified as touch or non-touch patches (or paths). Non-touch patches can be ignored which can reduce processing requirements for the touch sensing system and can improve touch detection performance in wet environments.

Figure 10:
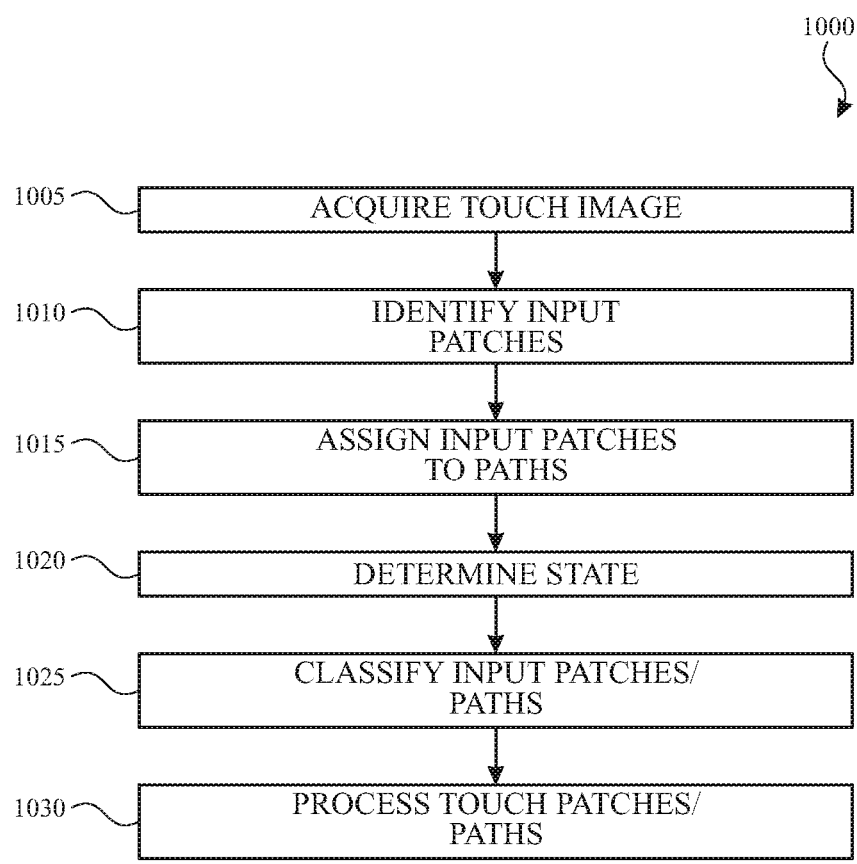
FIG. 10 illustrates an exemplary process for processing input to a touch-sensitive surface according to examples of the disclosure.

In some examples, a state of the device can be determined, and different criteria, chosen based on the state of the device, can be used to classify an input patch as a touch patch or a non-touch patch. FIG. 10 illustrates an exemplary process 1000 for processing input to a touch-sensitive surface according to examples of the disclosure. A touch image can be acquired at 1005, and input patches can be identified based on the touch image at 1010. The details of touch image acquisition and input patch identification can correspond to the process 500 described above with respect to FIG. 5 (the details of which are omitted here for brevity). At 1015, input patches can be assigned to paths. As described herein, a path can be used to track input patches corresponding to an object across multiple touch images. For example, when an input patch corresponding to a previously detected and tracked object is detected in a touch image, the input patch can be assigned to an existing path tracking the object. When an input patch is detected that does not correspond to a previously detected and tracked object (e.g., touchdown condition), a new path can be created. When no input patch is detected in a touch image that corresponds to a previously existing path (e.g., liftoff condition), the path can be subsequently deleted (e.g., after processing touch input associated with the path). It should be understood that the touch sensing system of a touch-sensitive device determines whether an input patch belongs to a previously existing path or to a new path based on the inputs on the touch sensor. As a result, in some instances an input patch from the same object may be assigned to a new path or an input patch from a different object may be assigned to a previously existing path based on a mistaken determination by the touch sensing system. A well designed touch sensing system can, however, reduce the number of false positives/negatives in determining whether or not to assign an input patch to a new or previously existing path.

At 1020, a state of the device can be determined. For example, the state of the device can be a first state corresponding to a dry environment and a second state corresponding to a wet environment. The determination of state can be based on an amount of floating and/or partially grounded water detected on the touch-sensitive surface, as described in more detail below. It should be understood that the touch sensing system measures touch signals from the touch nodes and identifies touch signals or input patches meeting one or more characteristics that can indicate the presence of floating and/or partially grounded water (e.g., touch signals or input patches remaining after subtracting a guarded scan touch image from a non-guarded scan tough image). For ease of description the touch signals and input patches conditions corresponding to floating and/or partially grounded water can be referred to as the amount of floating and/or partially grounded water. Although illustrated as following the identification of input patches and assignment of input patches to paths, the determination of state can occur before or in parallel with the identification of input patches or assignment of input patches to paths.

At 1025, input patches (and/or paths) can be classified. The classification can identify input patches (and/or corresponding paths) as corresponding to likely intended/actual touches (also referred to herein as "valid touches" or "touch patches") or as corresponding to likely unintended touches or liquids such as water (also referred to herein as "invalid touches" or "non-touch patches"). In some examples, input patches (and/or corresponding paths) can be classified as proximity patches/paths. The classification can be based on the determined state, as described below in more detail.

At 1030, input patches identified as touch patches can be further processed to determine touch input for the computing system. The further processing can include further parameterization of the input patches (and/or paths). In some examples, the further processing can include algorithms to compensate for ungrounded or poorly grounded objects, to compensate for negative touch pixel effects, to reject contacts from liquids (e.g., water), and/or to detect gestures. Input patches classified as non-touch patches and/or proximity patches can be excluded from the further processing. By forgoing this further processing, the touch sensing system can reduce processing requirements and can improve touch performance when operating in wet environments.

Figure 11:
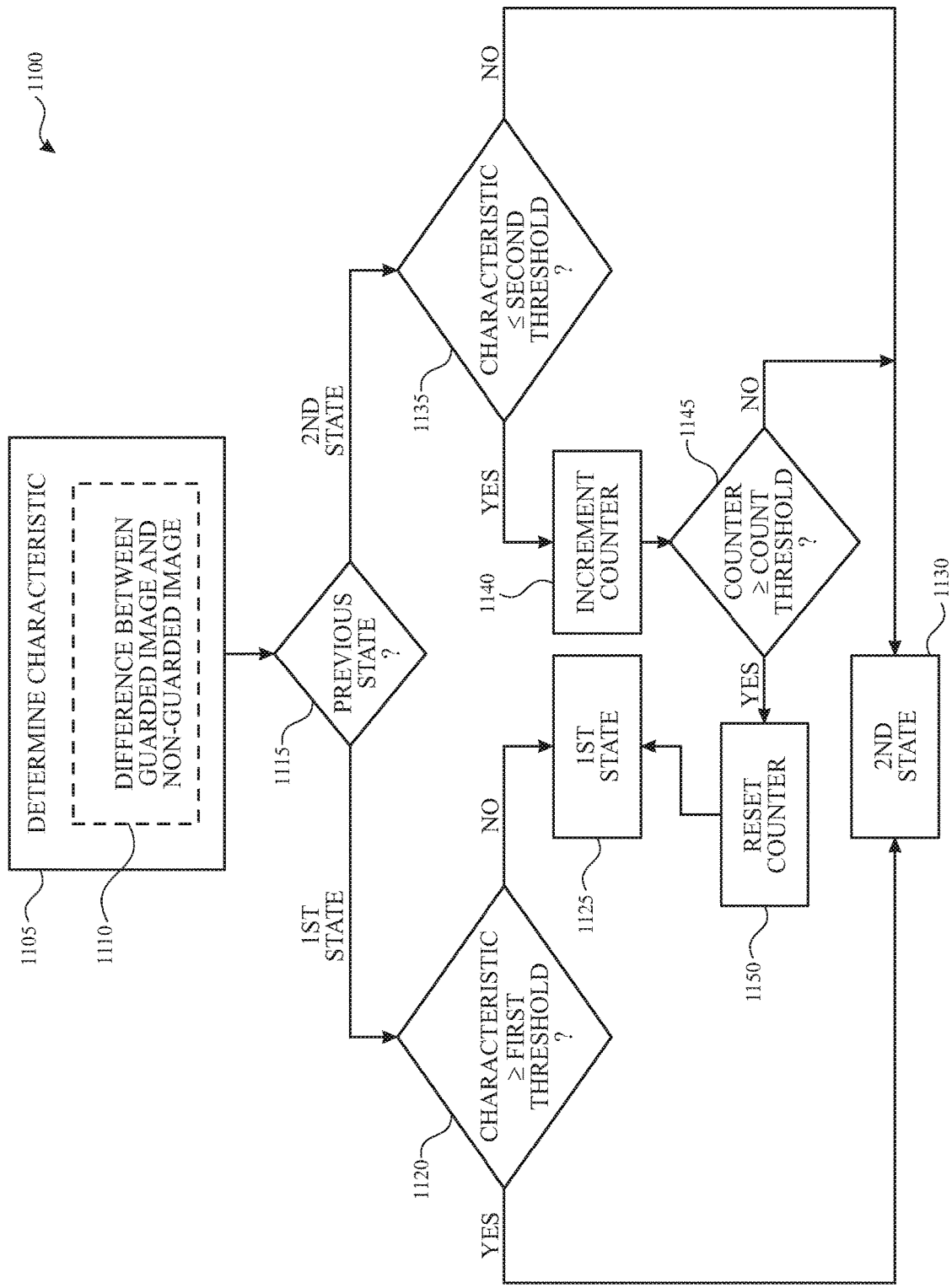
FIG. 11 illustrates an exemplary process for determining a state according to examples of the disclosure.

FIG. 11 illustrates an exemplary process 1100 for determining a state according to examples of the disclosure. Process 1100 can correspond to the state determination at 1020 in process 1000. As discussed above, in some examples, a first state can correspond to a dry environment and a second state can correspond to a wet environment. In some examples, the state of the device can be based on a characteristic of an acquired touch image. At 1105, a characteristic can be determined from an acquired touch image. In some examples, the characteristic can be an amount of floating and/or partially grounded water. The amount of floating and/or partially grounded water can be represented as a percentage of area of the touch nodes/touch-sensitive surface (referred to herein as floating water area percentage).

The floating water area percentage can be computed from one or more acquired touch images. For example, at 1110, a difference image between a guarded scan image and a non-guarded scan image can indicate touch nodes detecting floating or partially grounded water. A guarded scan image can be generated by driving non-sensed touch nodes with the same stimulation as sensed touch nodes. The stimulation applied to non-sensed touch nodes can cause objects, such as floating water, to have a voltage corresponding to the stimulation. However, other objects, such as a finger, can be unaffected (or be negligibly affected) by the stimulation applied to the non-sensed touch nodes. As a result, the guarded scan image can capture fingers and exclude floating water. A non-guarded scan image can be generated by grounding non-sensed touch nodes. As a result, objects such as floating water can be grounded. Thus, the non-guarded scan image can capture both fingers and floating water. Taking a difference between the guarded and non-guarded scan images can result in an image including floating water but filtering out touches from objects (e.g., fingers, styli, etc.).

Figure 12:
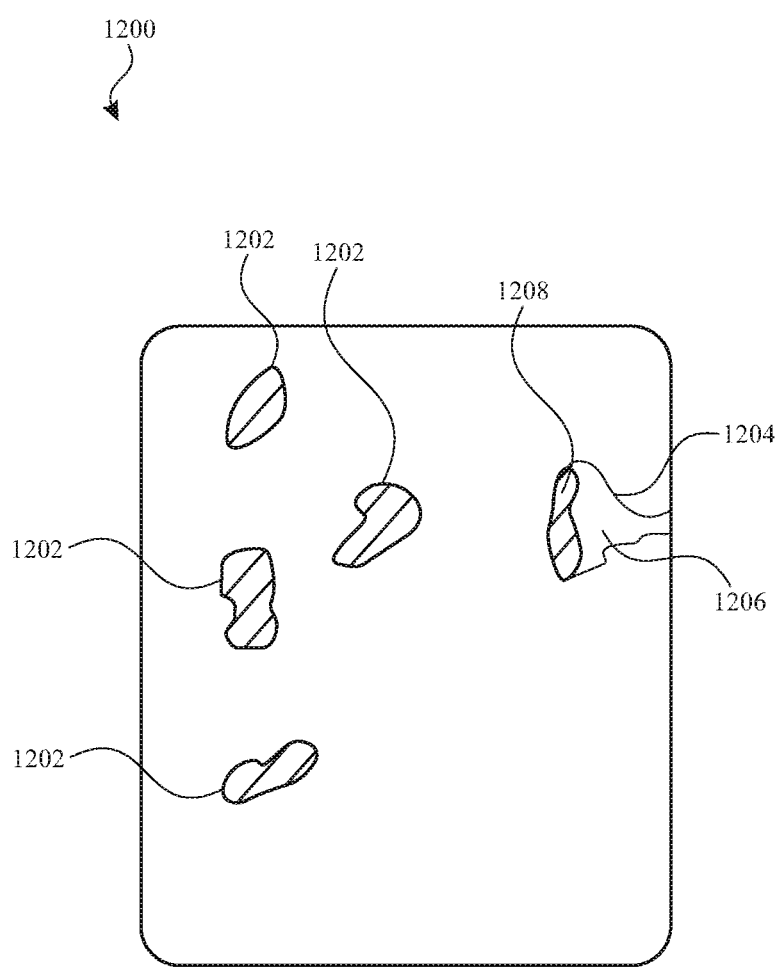
FIG. 12 illustrates an exemplary determination of floating water area percentage according to examples of the disclosure.

FIG. 12 illustrates an exemplary determination of floating water area percentage according to examples of the disclosure. Touch image 1200 can correspond to four floating water drops 1202 and one bezel-contacting water drop 1204. Due to properties of water, the bezel-contacting water drop 1204 may only be partially grounded. A portion 1206 of the bezel-contacting water drop 1204 may appear as grounded and portion 1208 of the bezel-contacting water drop 1204 may appear as floating (based on the signals at the corresponding touch nodes). A first image (a non-guarded scan image) can capture all floating and grounded objects including the four floating water drops 1202 and one bezel-contacting water drop 1204. A second image (a guarded scan image) can capture only well-grounded objects including portion 1206 of the bezel-contacting water drop 1204. The difference between the first and second images (i.e., a difference image) can leave behind the floating and partially grounded objects including the four floating water drops 1202 and portion 1208 of bezel-contacting water drop 1204. The number of touch nodes in the difference image can be divided by the total number of touch nodes of the touch-sensitive surface to determine the floating water area percentage.

In some examples, the state of the device can be determined to be the first state when the floating water area percentage fails to meet the floating water area threshold, and the state of the device can be determined to be the second state when the floating water area percentage meets the floating water area threshold. In some examples, to avoid high frequency switching between these states, hysteresis can be applied in the state determination. For example, transition from the first state to the second state can occur when the floating water area percentage meets (e.g., exceeds) a first floating water area threshold. Transition from the second state to the first state can occur when the floating water area percentage meets (falls below) a second floating water area threshold. The first floating water area threshold can be higher than the second floating water area threshold. For example, the first floating water area threshold can be set between 5%-25% (e.g., 10%) and the second floating water area threshold can be set lower than the first floating water area threshold. In some examples, the second floating water area threshold can be between 1% and 10% (e.g., 5%).

In some examples, a transition between the first and second state can also require the floating water area threshold(s) be satisfied for a threshold number of touch images. For example, the second state can be entered into when the floating water area percentage meets the floating water area threshold (or the first floating water area threshold) for a first threshold number of touch images. The first state can be entered into when the floating water area percentage fails to meet the floating water area threshold (or meets (falls below) the second floating water area threshold) for a second threshold number of touch images. In some examples, the first threshold number of touch images and the second threshold number of touch images can be the same. In some examples, the first threshold number of touch images and the second threshold number of touch images can be different. For example, to be responsive to sudden wet environments, the first threshold number of touch images can be one in some examples. However, due to chaotic nature of water in wet environments, floating or partially grounded water may not be detected in every touch image, so the second threshold number of touch images can be greater than one (e.g., five) to avoid transitioning to the first state prematurely when the environment is still a wet environment.

The remainder of process 1100 in FIG. 11 represents an exemplary hysteresis applied to the state determination. At 1115, the touch sensing system can determine the previous state. When the touch sensing system was previously in the first state, the system can compare, at 1120, the characteristic (e.g., floating water area percentage) to a first characteristic threshold (e.g., first floating water area threshold). When the characteristic meets the first characteristic threshold, the touch sensing system can transition to the second state for classifying the input patches in the touch image (1130). When the characteristic fails to meet the first characteristic threshold, the touch sensing system can remain in the first state for classifying the input patches in the touch image (1125). When the touch sensing system was previously in the second state, the system can compare, at 1135, the characteristic (e.g., floating water area percentage) to a second characteristic threshold (e.g., second floating water area threshold). When the characteristic fails to meet (remains above) the second characteristic threshold, the touch sensing system can remain in the second state for classifying the touch image (1130). When the characteristic meets (falls below) the second characteristic threshold, a counter can be incremented at 1140. When the counter meets a counter threshold (corresponding to the threshold number of touch images), the counter can be reset at 1150, and the touch sensing system can transition to the first state (1125). When the counter fails to meet the counter threshold, the touch sensing system can remain in the second state (1130).

Figure 13:
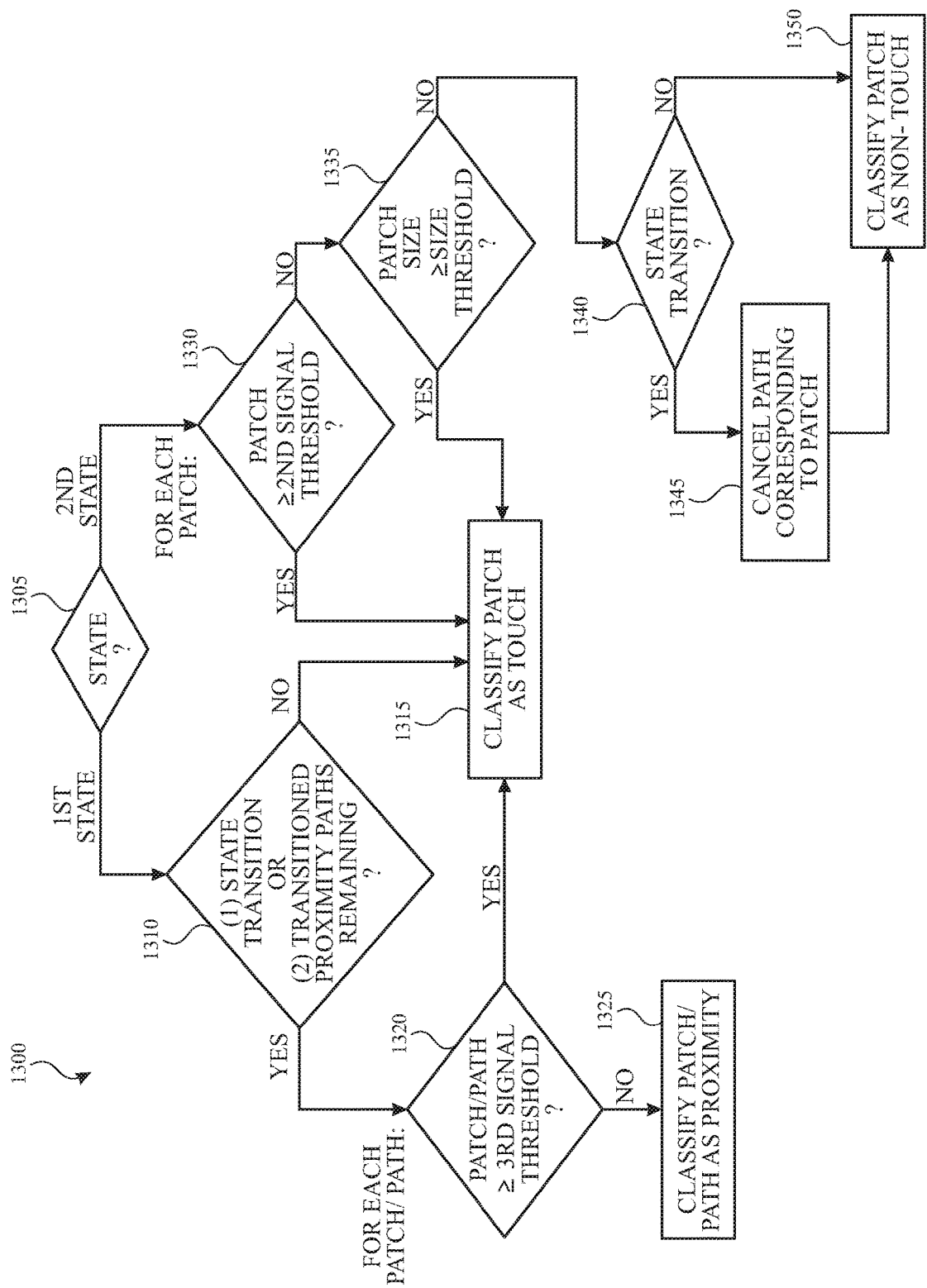
FIG. 13 illustrates an exemplary process for classifying input patches (and/or paths) according to examples of the disclosure.

FIG. 13 illustrates an exemplary process 1300 for classifying input patches (and/or paths) according to examples of the disclosure. Process 1300 can correspond to the classification of input patches (and/or paths) at 1025 in process 1000. As discussed above, the classification can be based on the determined state (e.g., as determined in process 1100). For example, the criteria used to classify an input patch in the first state can be different from the criteria used to classify an input patch in the second state. For example, in the first state (e.g., corresponding to a dry environment), input patches identified in a touch image (e.g., at 1010 in process 1000) using a first (default) signal threshold can be classified as touch patches. For example, a peak signal from among the plurality of touch nodes of an input patch can be determined (and/or tracked for a corresponding path) and compared to the first signal threshold. In a second state (e.g., corresponding to a wet environment), input patches identified in a touch image (e.g., at 1010 in process 1000) can be classified as touch patches when the input patch meets a heighted second signal threshold or meets a size threshold. However, in the second state, input patches identified in the touch image that fail to meet the heightened second signal threshold and fail to meet the size threshold can be classified as non-touch patches. For example, the peak signal from among the plurality of touch nodes of an input patch can be determined (and/or tracked for a corresponding path) and compared to the second signal threshold. In some examples, the size threshold can be a threshold number of touch nodes corresponding to the input patch. In some examples, the size threshold can be a threshold geometric mean radius.

Additionally, transitions between states can require special handling of existing or new paths. For example, when transitioning from the first state to the second state, an input patch in a touch image classified in the second state may be classified as a non-touch patch, but the input patch may have been classified as a touch patch in the first state (e.g., the input patch corresponds to a previously identified touch contact path. As a result, the transition from the first state to the second state can appear as a liftoff of a contact/path. This liftoff, however, may a false positive liftoff triggered by the state transition. To avoid mistakenly determining touch input based on this false positive liftoff, the touch sensing system can cancel input from the corresponding path when transition into the second state. As another example, when transition from the second state to the first state, an input patch in a touch image classified in the first state may be classified as a touch patch, but the input patch may correspond to a non-touch patch/path in the second state. As a result, the transition from the second state to the first state can appear as a touchdown of a contact. This touch-down, however, may be a false positive touchdown triggered by the state transition. To avoid mistakenly determining touch input based on this false positive touchdown, the touch sensing system can classify input patches and/or paths that exist in the touch image at transition and that fail to satisfy the second signal threshold as proximity patches/paths. These input patches and/or paths can continue to be reported as proximity patches/paths until the input patches and/or paths meet the second signal threshold or until the path disappears.

At 1305, a determination of state can be made. As discussed above, the determination of the state can correspond to process 1100 of FIG. 11. When the state is determined to be the first state, the touch sensing system can determine, at 1110, whether (1) the state transitioned based on the acquired touch frame or (2) whether there are remaining proximity paths corresponding to an earlier transition from the second state to the first state. In accordance with no state transition and no remaining proximity paths from an earlier transition, input patches identified in the acquired touch image can be classified as touch patches (1315). In accordance with a state transition or remaining proximity paths from an earlier transition, the touch sensing system can determine for each input patch, at 1320, whether the input patch or its corresponding pre-transition path meets the third signal threshold. When the input patch and/or its corresponding pre-transition path meets the third signal threshold, the input patch/path can be classified as a touch patch/path (1315). When the input patch and/or its corresponding pre-transition path fail to meet the third signal threshold, the input patch/path can be classified as a proximity patch/path (1325). In some examples, the third signal threshold and the second signal threshold can be the same. In some examples, the third signal threshold can be different than the second signal threshold (e.g., between the first and second signal thresholds).

When the state is determined to be the second state at 1305, the touch sensing system can determine, at 1330, whether the input patch meets the second signal threshold. When the input patch meets the second signal threshold, the input patch can be classified as a touch patch (1315). When the input patch fails to meet the second signal threshold, the touch sensing system can determine, at 1335, whether the input patch meets a size threshold. When the input patch meets the size threshold, the input patch can be classified as a touch patch (1315). When the input patch fails to meet the size threshold, the touch sensing system can determine, at 1340, whether the state transitioned based on the acquired touch frame from the first state to the second state. In accordance with no state transition, the input patches identified in the acquired touch image can be classified as non-touch patches (1350). In accordance with a state transition, the touch sensing system can cancel a path corresponding to the input patch (1345) and then classify the input patch as a non-touch patch (1350).

In some examples, the processes of FIGS. 10-13 can be used to avoid jitter in wet environments. FIGS. 14A-C illustrate exemplary representations of input patches corresponding to floating water and one or more fingers on a touch-sensitive surface according to examples of the disclosure. FIGS. 14A-C illustrate a touch-sensitive surface 1400 with one or more input patches. In FIG. 14A, input patch 1402 can correspond, for example, to floating water on touch sensitive surface 1400. Input patch 1402 can have a centroid 1404. In FIG. 14B, input patch 1406 can correspond to an object (e.g., a finger indicated in region 1408) and the floating water (indicated in region 1410). Input patch 1406 can have a centroid 1412. When the object lifts off, the water remaining on the touch sensitive surface can return to its previous position and shape (as illustrated in FIG. 14A) or remain on the touch-sensitive surface with a new position and shape, as illustrated by input patch 1414 with centroid 1416 in FIG. 14C. In a conventional touch sensing system, each of input patches 1402, 1406 and 1414 can be detected as touches, but the centroid of the touch can rapidly change at the touchdown condition or the liftoff condition, introducing some jitter into the touch sensing system.

However, using the processes described with reference to FIGS. 10-13, floating water of input patch 1402 can cause the touch sensing system to enter the second state, and in the second state, input patch 1402 can be classified as a non-touch for failing to meet the second signal threshold (i.e., without requiring downstream processing to identify and reject the input patch 1402). Additionally, in the second state, input patch 1414 can also be classified as a non-touch for failing to meet the second threshold. While the finger is down, input patch 1406 can meet the second signal threshold and its centroid can be used for touch input. As a result, the touchdown and liftoff of the finger can be detected and trigger touch input (e.g., corresponding to a tap) without jitter in the position.

Although FIG. 14B illustrates a centroid 1412, which is offset with respect to the true center of the object (indicated in region 1408), in some examples, the further processing of input patch 1406 can improve the centroid detection. For example, a suppression threshold can be applied to input patch 1406 to reduce noise of that may impact centroid computation. In some examples, a signal strength threshold can be applied to suppress weaker touch node contributions (usually near the border of the input patch). In some examples, the suppression can be achieved by weighting touch nodes based on their location in the input patch, such that measurements of touch nodes near the border of the input patch can have less impact on the centroid. The floating water in region 1410, which can be grounded by the finger in region 1408, can have weaker signal levels when compared with the finger (especially moving away from the finger). As a result, the further processing of input patch 1406 including suppression of weaker signal measurements and/or border measurements can improve the centroid to better reflect the centroid of the finger in region 1408.

Figures 15A, 15B, 15C:
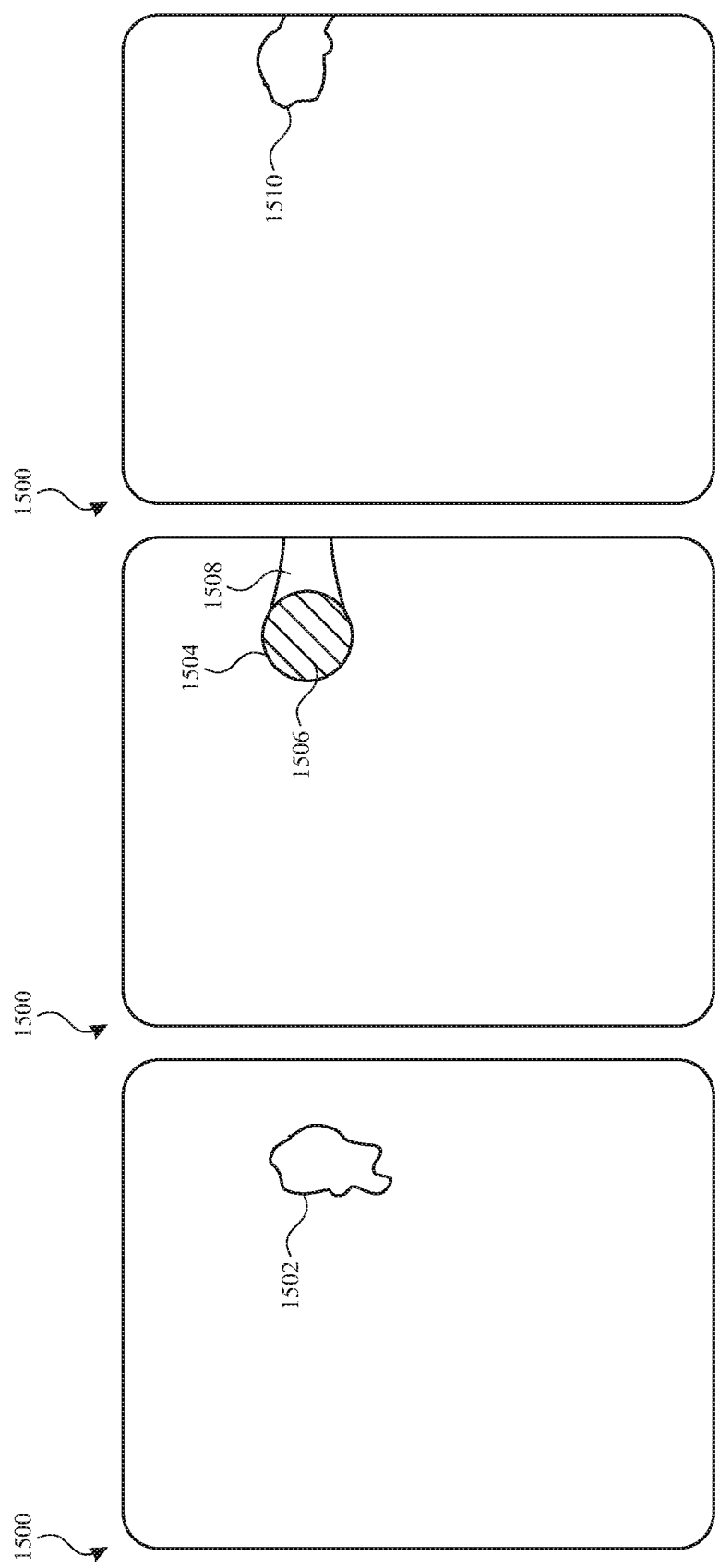
FIG. 15A-C illustrate another exemplary representation of input patches corresponding to floating water and/or one or more fingers on a touch-sensitive surface according to examples of the disclosure.

In some examples, the processes of FIGS. 10-13 can be used to improve detection of liftoff in wet environments. FIG. 15A-C illustrate another exemplary representation of input patches corresponding to floating water and/or one or more fingers on a touch-sensitive surface according to examples of the disclosure. FIGS. 15A-C illustrate a touch-sensitive surface 1500 with one or more input patches. In FIG. 15A, input patch 1502 can correspond, for example, to floating water on touch sensitive surface 1500. In FIG. 15B, input patch 1504 can correspond to an object (e.g., a finger indicated in region 1506) and the floating water (indicated in region 1508). When the object touches down, the floating water may move and come into contact with the object and/or a bezel on an edge of touch-sensitive surface 1500. After liftoff of the object, the floating water can remain on the touch sensitive surface 1500 as indicated by input patch 1510 in FIG. 15C. The floating water of input patch 1510 can be displaced from and/or have a different shape than the floating water of input patch 1502. In particular, input patch 1510 can be contacting the bezel on the edge of touch-sensitive surface 1500, whereas input patch 1502 can be floating and not in contact with the bezel. In a conventional touch sensing system, each of input patches 1502, 1504 and 1510 can be detected as touches, though the floating water of input patch 1502 can be rejected by further processing. However, due to bezel-grounding of the water corresponding to input patch 1510, input patch 1510 can still be processed as a touch patch. As a result, although touchdown of the object (indicated by region 1506 in FIG. 15B) may be detected, the liftoff of the object may not be detected, leading to degraded touch performance.

However, using the processes described with reference to FIGS. 10-13, floating water of input patch 1502 can cause the touch sensing system to enter the second state, and in the second state, input patch 1502 can be classified as a non-touch for failing to meet the second signal threshold (i.e., without requiring downstream processing to identify and reject the input patch 1502). Additionally, in the second state, input patch 1510 can also be classified as a non-touch for failing to meet the second threshold even though it may be grounded by the bezel. While the object is down, input patch 1504 can meet the second signal threshold. As a result, the touchdown and liftoff of the object can be detected and trigger touch input (e.g., corresponding to a tap).

Additionally, in some examples, a small water droplet that falls on a touch-sensitive surface and becomes grounded by the bezel can be falsely detected as a touchdown. When the small water droplet then rolls over the edge and is no longer detected by the touch-sensitive surface, the touch sensing system can falsely detect a liftoff. As a result, the water droplet could be falsely detected as a tap touch input in a conventional touch sensing system. Alternatively, in some examples, a small water droplet along the edge can roll down the edge of the touch-sensitive surface while remaining grounded to the edge can be falsely detected as a swipe gesture input in a conventional touch sensing system. Using the processes of FIGS. 10-13, however, the water droplets can be classified as non-touch patches when they fail to meet the second signal threshold. In some examples, a path classified as a non-touch can still be tracked across multiple frames and ignored without requiring reevaluation of the input patches associated with the path in each touch frame as the water drop moves across the touch-sensitive surface.

Figure 16A:
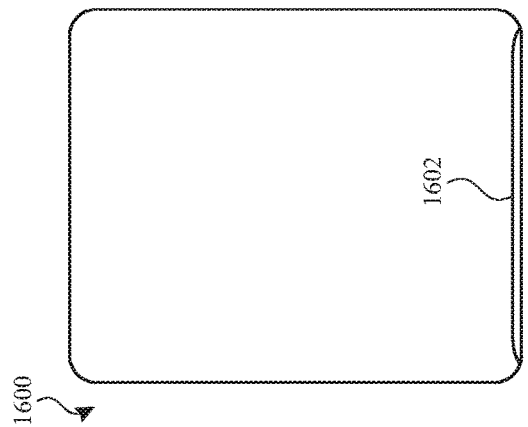
FIGS. 16A-F illustrate another exemplary representation of input patches corresponding to floating water and/or one or more fingers on a touch-sensitive surface according to examples of the disclosure.
Figure 16B:
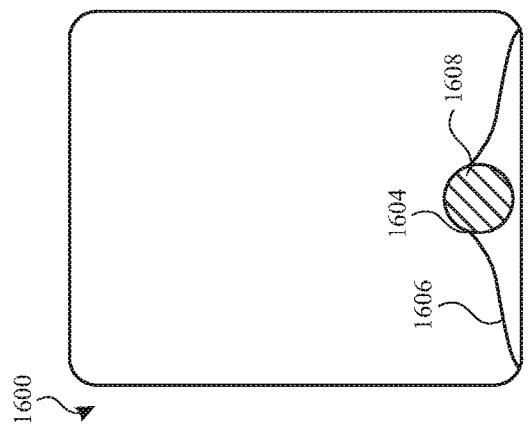
Figure 16C:
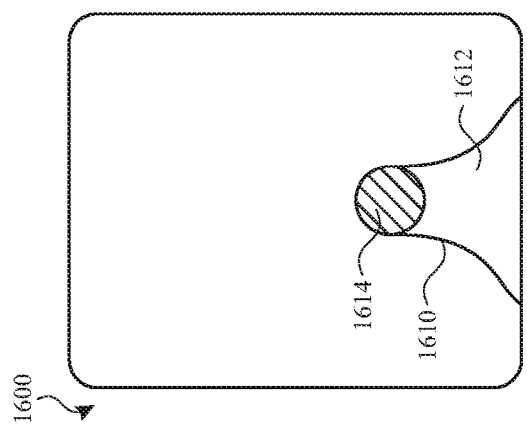
Figure 16D:
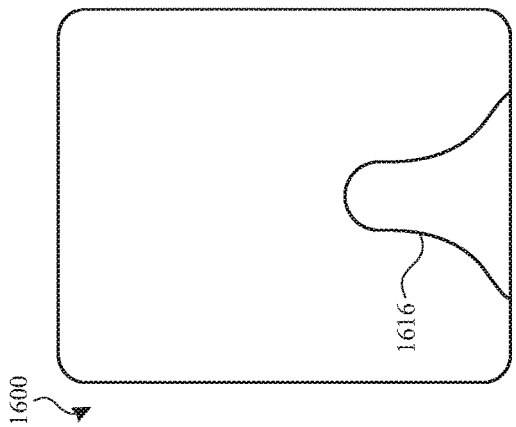
Figure 16E:
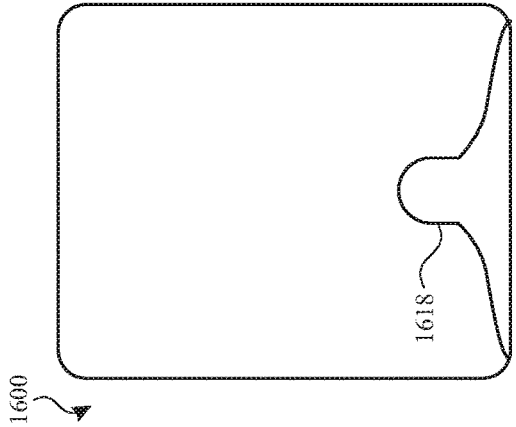
Figure 16F:
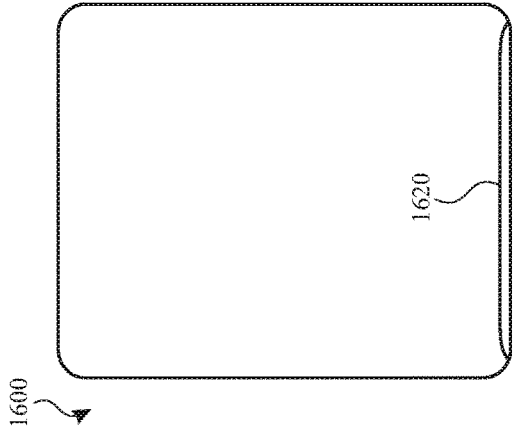

In some examples, the processes of FIGS. 10-13 can be used to improve detection of swipe gestures in wet environments. FIGS. 16A-F illustrate another exemplary representation of input patches corresponding to floating water and/or one or more fingers on a touch-sensitive surface according to examples of the disclosure. FIGS. 16A-F illustrate a touch-sensitive surface 1600 with one or more input patches. In FIG. 16A, input patch 1502 can correspond, for example, to water on touch sensitive surface 1600. In FIG. 16B, input patch 1604 can correspond to an object (e.g., a finger indicated in region 1608) and the water (indicated in region 1606). When the object touches down, the floating water may move and come into contact with the object. The object (e.g., a finger) can swipe upward and a trail of water can follow behind it. As illustrated in FIG. 16C, input patch 1610 can correspond to the object (indicated in region 1614) and the trail of water (indicated in region 1612). After liftoff of the object, the water can remain on the touch sensitive surface and eventually return back to the edge of the touch screen as illustrated by input patches 1616, 1618 and 1620 in FIGS. 16D-F. In a conventional touch sensing system, each of input patches 1602, 1604, 1610, 1616, 1618 and 1620 can be detected as touches. As a result, the touch sensing system can view a centroid of the input patches (biased toward the edge by the trail of floating water) swiping up and then swiping back down. As a result, rather than detecting a swipe gesture and performing the corresponding action in response to the detected swipe gesture, the touch sensing system can detect a swipe gesture followed by a reverse swipe gesture, without an intermediate liftoff. As a result, the reverse swipe gesture can cancel the swipe gesture, leading to degraded touch performance.

However, using the processes described with reference to FIGS. 10-13, water of input patch 1602 (or other water on the touch-sensitive surface) can cause the touch sensing system to enter the second state, and in the second state, input patch 1602 can be classified as a non-touch for failing to meet the second signal threshold (i.e., without requiring downstream processing to identify and reject the input patch 1602). Additionally, in the second state, input patch 1604 and 1610 can meet the second threshold and be classified as a touch patches, allowing for the detection of the swipe gesture. Once the object lifts off, input patches 1616, 1618 and 1620 can be classified as non-touch patches for failing to meet the second threshold. As a result, the swipe gesture and liftoff of the object can be detected and trigger touch input (e.g., corresponding to the swipe gesture), without detecting a false reverse swipe gesture.

As described above with respect to FIG. 14B, the further processing of input patches 1504, 1604 and 1614 can include suppression techniques to improve centroid detection. The suppression techniques can weaken or exclude signal measurements corresponding to floating or partially grounded water. As a result, a more accurate centroid can be determined to better detect the intended location of a tap gesture or to better detect a swipe gesture that might otherwise be masked by a trail of water behind the finger.

Although the processes 700 is described herein separately from processes 1000, 1100 and 1300, it should be understood that these processes can be used in combination (e.g., at 515 of process 500) to classify input patches.

Therefore, according to the above, some examples of the disclosure are directed to a method. The method can comprise acquiring a first touch image, processing the first touch image to identify one or more input patches, and determining a state from a first state and a second state based on the first touch image. The method can further comprise, for a respective input patch of the one or more input patches: classifying the respective input patch as a touch patch or a non-touch patch based on the determined state. In the first state, the respective patch can be classified as a touch patch when a first signal parameter associated with the respective input patch meets a first signal threshold and the respective patch can be classified as a non-touch patch when the first signal parameter associated with the respective input patch fails to meet the first signal threshold. In the second state, the respective patch can be classified as a touch patch when the first signal parameter associated with the respective input patch meets a second signal threshold, the second signal threshold greater than the first signal threshold, or when a size parameter of the respective input patch meets a size threshold, and the respective patch can be classified as a non-touch patch when the first signal parameter associated with the respective input patch fails to meet the second signal threshold and the size parameter fails to meet the size threshold. The method can further comprise further processing the first touch image to determine touch input. The further processing can comprise processing respective input patches classified as touch patches and forging processing of respective input patches classified as non-touch patches. Additionally or alternatively, in some examples, determining the state can comprise determining a characteristic of the first touch image. Additionally or alternatively, in some examples, the characteristic can correspond to an area of a touch-sensitive surface contacted by one or more floating objects. Additionally or alternatively, in some examples, determining the characteristic can comprise acquiring a second touch image, the second touch image generated by a stimulation guarded scan, and subtracting the second touch image from the first touch image. Additionally or alternatively, in some examples, determining the state can comprise transitioning from the first state to the second state when the characteristic meets a first characteristic threshold. Additionally or alternatively, in some examples, determining the state can comprise transitioning from the second state to the first state when the characteristic fails to meet a second characteristic threshold for a threshold number of touch images. Additionally or alternatively, in some examples, determining the state can comprise maintaining the state when the characteristic fails to meet a first characteristic threshold, but meets a second characteristic threshold. Additionally or alternatively, in some examples, the method can further comprise, for the respective input patch of the one or more input patches: in accordance with classifying the respective input patch as a non-touch patch, when transitioning from the first state to the second state and when a corresponding respective patch was classified pre-transition as a touch patch, canceling touch input resulting from processing of the corresponding respective patch. Additionally or alternatively, in some examples, the method can further comprise for the respective input patch of the one or more input patches: in accordance with classifying the respective input patch as a touch patch, when transitioning from the second state to the first state and when a corresponding respective patch was classified pre-transition a as non-touch patch, reclassifying the respective input patch as a non-touch patch until liftoff of an object corresponding to the corresponding respective patch or until the respective input patch meets a third signal threshold. Some examples of the disclosure are directed to a non-transitory computer readable storage medium. The non-transitory computer readable storage medium can store instructions, which when executed by one or more processors, can cause the one or more processors to perform any of the above methods. Some examples of the disclosure are directed to an electronic device. The electronic device can comprise a touch-sensitive surface and one or more processors coupled to the touch-sensitive surface. The one or more processors can be capable of performing and/or programmed to perform any of the above methods.

Some examples of the disclosure are directed to a method. The method can comprise acquiring a touch image and identifying one or more input patches based on the touch image. The method can further comprise, for a respective input patch of the one or more input patches: identifying a number of strong edges of the respective input patch. A strong edge can correspond to measurements of one or more sensors of a respective edge of a touch-sensitive surface indicative of grounding of an object corresponding to the respective input patch. The method can further comprise, for the respective input patch of the one or more input patches: in accordance with the identified number of strong edges meeting a first threshold, calculating a confidence value of the respective input patch; in accordance with the confidence value meeting a confidence threshold, forgo processing the respective input patch; and in accordance with the confidence value fail to meet a confidence threshold, processing the respective input patch. Additionally or alternatively, in some examples, the method can further comprise, for the respective input patch of the one or more input patches: in accordance with the identified number of strong edges meeting a second threshold, the second threshold greater than the first threshold, forgo calculating the confidence value of the respective input patch and setting the confidence value of the respective input patch to a value corresponding to a maximum confidence. Additionally or alternatively, in some examples, the method can further comprise, for the respective input patch of the one or more input patches: in accordance with the identified number of strong edges meeting a second threshold, the second threshold greater than the first threshold, increasing the calculated confidence value of the respective input patch. Additionally or alternatively, in some examples, the method can further comprise, for the respective input patch of the one or more input patches: in accordance with the identified number of strong edges failing to meet the first threshold, forgo calculating the confidence value of the respective input patch and setting the confidence value of the respective input patch to a value corresponding to a minimum confidence. Additionally or alternatively, in some examples, the confidence value can be calculated based on a signal density of the respective input patch. Additionally or alternatively, in some examples, the confidence value can be calculated based on an occupancy of the respective input patch. Additionally or alternatively, in some examples, the confidence value can selected from the larger of a normalized signal density of the respective input patch and a normalized occupancy of the respective input patch. Additionally or alternatively, in some examples, the confidence value can calculated based on a history of confidence values calculated from previous touch images. Additionally or alternatively, in some examples, an edge of the respective input patch can be a strong edge when a threshold number of sensors of the respective edge of the touch-sensitive surface meets a threshold signal threshold. Some examples of the disclosure are directed to a non-transitory computer readable storage medium. The non-transitory computer readable storage medium can store instructions, which when executed by one or more processors, can cause the one or more processors to perform any of the above methods. Some examples of the disclosure are directed to an electronic device. The electronic device can comprise a touch-sensitive surface and one or more processors coupled to the touch-sensitive surface. The one or more processors can be capable of performing and/or programmed to perform any of the above methods.

Some examples of the disclosure are directed to a method. The method can comprise acquiring a first touch image, processing the first touch image to identify one or more input patches, and determining a state from a first state and a second state based on an amount of floating water in the first touch image. The method can further comprise, for a respective input patch of the one or more input patches: classifying the respective input patch as a touch patch or a non-touch patch based on the determined state. In the first state the classification can be based on one or more first criteria, and in the second state, the classification can based on one or more second criteria, different than the one or more first criteria. The method can further comprise further processing the first touch image to determine touch input. The further processing can comprise processing respective input patches classified as touch patches and forging processing of respective input patches classified as non-touch patches. Additionally or alternatively, in some examples, determining the amount of floating water can comprise acquiring a second touch image, the second touch image generated by a stimulation guarded scan, and subtracting the second touch image from the first touch image. Additionally or alternatively, in some examples, determining the state can comprise transitioning from the first state to the second state when the amount of floating water meets a first amount of floating water threshold. Additionally or alternatively, in some examples, determining the state can comprise transitioning from the second state to the first state when the amount of floating water fails to meet a second amount of floating water threshold for a threshold number of touch images. Additionally or alternatively, in some examples, determining the state can comprise: maintaining the state when the amount of floating water fails to meet a first amount of floating water threshold, but meets a second amount of floating water threshold. Additionally or alternatively, in some examples, the method can further comprise, for the respective input patch of the one or more input patches: in accordance with classifying the respective input patch as a non-touch patch, when transitioning from the first state to the second state and when a corresponding respective patch was classified pre-transition a as touch patch, canceling touch input resulting from processing of the corresponding respective patch. Additionally or alternatively, in some examples, the method can further comprise, for the respective input patch of the one or more input patches: in accordance with classifying the respective input patch as a touch patch, when transitioning from the second state to the first state and when a corresponding respective patch was classified pre-transition as a non-touch patch, reclassifying the respective input patch as a non-touch patch until liftoff of an object corresponding to the corresponding respective patch or until the respective input patch meets a third signal threshold. Some examples of the disclosure are directed to a non-transitory computer readable storage medium. The non-transitory computer readable storage medium can store instructions, which when executed by one or more processors, can cause the one or more processors to perform any of the above methods. Some examples of the disclosure are directed to an electronic device. The electronic device can comprise a touch-sensitive surface and one or more processors coupled to the touch-sensitive surface. The one or more processors can be capable of performing and/or programmed to perform any of the above methods.

Some examples of the disclosure are directed to a method. The method can comprise acquiring a touch image including measurements from a plurality of touch nodes of a touch-sensitive surface and identifying one or more input patches based on the touch image. The one or more input patches can include touch nodes measurements meeting a first signal threshold. The method can further comprise, for a respective input patch of the one or more input patches: estimating a number of respective edges of the touch-sensitive surface included in the respective input patch that meet one or more edge criteria. The one or more edge criteria can comprises a threshold number of touch node measurements from touch nodes within a threshold distance of the respective edge of the touch-sensitive surface meeting a second signal threshold, the second signal threshold greater than the first signal threshold. he method can further comprise, for a respective input patch of the one or more input patches: in accordance with the estimated number of respective edges meeting a first threshold, calculating a confidence value of the respective input patch; in accordance with the confidence value meeting a confidence threshold, forgo processing the respective input patch; and in accordance with the confidence value failing to meet a confidence threshold, processing the respective input patch. Additionally or alternatively, in some examples, the threshold distance can include only touch nodes around a perimeter of the touch-sensitive surface. Additionally or alternatively, in some examples, the threshold number of touch nodes measurements can be one touch node measurement for the respective edge. Additionally or alternatively, in some examples, the one or more edge criteria can further comprise the threshold number of touch node measurements are from consecutive touch nodes. Some examples of the disclosure are directed to a non-transitory computer readable storage medium. The non-transitory computer readable storage medium can store instructions, which when executed by one or more processors, can cause the one or more processors to perform any of the above methods. Some examples of the disclosure are directed to an electronic device. The electronic device can comprise a touch-sensitive surface and one or more processors coupled to the touch-sensitive surface. The one or more processors can be capable of performing and/or programmed to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. An electronic device comprising:
a touch-sensitive surface; and
one or more processors coupled to the touch-sensitive surface programmed to:
acquire a first touch image;
process the first touch image to identify one or more input patches;
determine a state from a first state and a second state based on an amount of floating water in the first touch image;
for a respective input patch of the one or more input patches identified in the first touch image, classify the respective input patch as a touch patch or a non-touch patch based on the state determined based on the amount of floating water in the first touch image, wherein in the first state the classification is based on one or more first criteria, and in the second state, the classification is based on one or more second criteria, different than the one or more first criteria; and
further process the first touch image to determine touch input, wherein the further processing comprises processing respective input patches classified as touch patches and forgoing processing of respective input patches classified as non-touch patches.

2. The electronic device of claim 1, wherein determining the amount of floating water comprises:
acquiring a second touch image, the second touch image generated by a stimulation guarded scan; and
subtracting the second touch image from the first touch image.

3. The electronic device of claim 1, wherein determining the state comprises:
transitioning from the first state to the second state when the amount of floating water meets a first amount of floating water threshold.

4. The electronic device of claim 1, wherein determining the state comprises:
transitioning from the second state to the first state when the amount of floating water fails to meet a second amount of floating water threshold for a threshold number of touch images.

5. The electronic device of claim 1, wherein determining the state comprises:
maintaining the state when the amount of floating water fails to meet a first amount of floating water threshold, but meets a second amount of floating water threshold.

6. The electronic device of claim 1, the one or more processors further programmed to:
for the respective input patch of the one or more input patches:
in accordance with classifying the respective input patch as a non-touch patch, when transitioning from the first state to the second state and when a corresponding respective patch was classified pre-transition a as touch patch, cancel touch input resulting from processing of the corresponding respective patch.

7. The electronic device of claim 1, the one or more processors further programmed to:
for the respective input patch of the one or more input patches:
in accordance with classifying the respective input patch as a touch patch, when transitioning from the second state to the first state and when a corresponding respective patch was classified pre-transition as a non-touch patch, reclassify the respective input patch as a non-touch patch until liftoff of an object corresponding to the corresponding respective patch or until the respective input patch meets a third signal threshold.

8. A method comprising:
acquiring a first touch image;
processing the first touch image to identify one or more input patches;
determining a state from a first state and a second state based on an amount of floating water in the first touch image;
for a respective input patch of the one or more input patches identified in the first touch image, classifying the respective input patch as a touch patch or a non-touch patch based on the state determined based on the amount of floating water in the first touch image, wherein in the first state the classification is based on one or more first criteria, and in the second state, the classification is based on one or more second criteria, different than the one or more first criteria; and
further processing the first touch image to determine touch input, wherein the further processing comprises processing respective input patches classified as touch patches and forgoing processing of respective input patches classified as non-touch patches.

9. The method of claim 8, wherein determining the amount of floating water comprises:
acquiring a second touch image, the second touch image generated by a stimulation guarded scan; and
subtracting the second touch image from the first touch image.

10. The method of claim 8, wherein determining the state comprises:
transitioning from the first state to the second state when the amount of floating water meets a first amount of floating water threshold;
transitioning from the second state to the first state when the amount of floating water fails to meet a second amount of floating water threshold for a threshold number of touch images; and
maintaining the state when the amount of floating water fails to meet the first amount of floating water threshold, but meets the second amount of floating water threshold.

11. The method of claim 8, further comprising:
for the respective input patch of the one or more input patches:
in accordance with classifying the respective input patch as a non-touch patch, when transitioning from the first state to the second state and when a corresponding respective patch was classified pre-transition a as touch patch, canceling touch input resulting from processing of the corresponding respective patch.

12. The method of claim 8, further comprising:
for the respective input patch of the one or more input patches:
in accordance with classifying the respective input patch as a touch patch, when transitioning from the second state to the first state and when a corresponding respective patch was classified pre-transition as a non-touch patch, reclassifying the respective input patch as a non-touch patch until liftoff of an object corresponding to the corresponding respective patch or until the respective input patch meets a third signal threshold.

13. A non-transitory computer readable storage medium storing instructions, which when executed by one or more processors, cause the one or more processors to perform a method, the method comprising:
acquiring a first touch image;
processing the first touch image to identify one or more input patches;
determining a state from a first state and a second state based on the first touch image;
for a respective input patch of the one or more input patches identified in the first touch image:
classifying the respective input patch as a touch patch or a non-touch patch based on the state determined based on the amount of floating water in the first touch image, wherein:
in the first state, the respective patch is classified as a touch patch when a first signal parameter associated with the respective input patch meets a first signal threshold and the respective patch is classified as a non-touch patch when the first signal parameter associated with the respective input patch fails to meet the first signal threshold; and
in the second state, the respective patch is classified as a touch patch when the first signal parameter associated with the respective input patch meets a second signal threshold, the second signal threshold greater than the first signal threshold, or when a size parameter of the respective input patch meets a size threshold, and the respective patch is classified as a non-touch patch when the first signal parameter associated with the respective input patch fails to meet the second signal threshold and the size parameter fails to meet the size threshold; and
further processing the first touch image to determine touch input, wherein the further processing comprises processing respective input patches classified as touch patches and forgoing processing of respective input patches classified as non-touch patches.

14. The non-transitory computer readable storage medium of claim 13, wherein determining the state comprises:
determining a characteristic of the first touch image.

15. The non-transitory computer readable storage medium of claim 14, wherein the characteristic corresponds to an area of a touch-sensitive surface contacted by one or more floating objects.

16. The non-transitory computer readable storage medium of claim 14, wherein determining the characteristic comprises:
acquiring a second touch image, the second touch image generated by a stimulation guarded scan; and
subtracting the second touch image from the first touch image.

17. The non-transitory computer readable storage medium of claim 14, wherein determining the state comprises:

transitioning from the first state to the second state when the characteristic meets a first characteristic threshold.

18. The non-transitory computer readable storage medium of claim 14, wherein determining the state comprises:
   transitioning from the second state to the first state when the characteristic fails to meet a second characteristic threshold for a threshold number of touch images.

19. The non-transitory computer readable storage medium of claim 13, the method further comprising:
   for the respective input patch of the one or more input patches:
      in accordance with classifying the respective input patch as a non-touch patch, when transitioning from the first state to the second state and when a corresponding respective patch was classified pre-transition as a touch patch, canceling touch input resulting from processing of the corresponding respective patch.

20. The non-transitory computer readable storage medium of claim 13, the method further comprising:
   for the respective input patch of the one or more input patches:
      in accordance with classifying the respective input patch as a touch patch, when transitioning from the second state to the first state and when a corresponding respective patch was classified pre-transition a as non-touch patch, reclassifying the respective input patch as a non-touch patch until liftoff of an object corresponding to the corresponding respective patch or until the respective input patch meets a third signal threshold.

* * * * *